United States Patent
Lee et al.

(10) Patent No.: US 10,075,205 B2
(45) Date of Patent: Sep. 11, 2018

(54) METHOD AND APPARATUS FOR PROVISIONING PROFILES

(71) Applicant: Samsung Electronics Co., Ltd., Suwon-si, Gyeonggi-do (KR)

(72) Inventors: Duckey Lee, Seoul (KR); Jonghan Park, Bucheon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/688,206

(22) Filed: Apr. 16, 2015

(65) Prior Publication Data

US 2015/0303966 A1     Oct. 22, 2015

(30) Foreign Application Priority Data

Apr. 22, 2014 (KR) .................. 10-2014-0048351

(51) Int. Cl.
| | | |
|---|---|---|
| *H04M 1/00* | (2006.01) | |
| *H04B 1/3816* | (2015.01) | |
| *H04W 4/12* | (2009.01) | |
| *H04W 12/04* | (2009.01) | |
| *H04L 29/08* | (2006.01) | |
| *H04W 8/20* | (2009.01) | |
| *H04L 9/32* | (2006.01) | |

(Continued)

(52) U.S. Cl.
CPC ......... *H04B 1/3816* (2013.01); *H04L 9/3234* (2013.01); *H04L 67/306* (2013.01); *H04W 4/12* (2013.01); *H04W 8/205* (2013.01); *H04W 12/04* (2013.01); *H04L 2209/80* (2013.01); *H04W 8/183* (2013.01); *H04W 12/06* (2013.01)

(58) Field of Classification Search
CPC ...... H04B 1/3816; H04W 4/12; H04W 12/06; H04W 8/205; H04W 88/02; H04W 8/183; H04W 12/04; H04L 67/306
USPC .................................. 455/466, 558
See application file for complete search history.

(56) References Cited

U.S. PATENT DOCUMENTS

| | | |
|---|---|---|
| 2011/0170517 A1 | 7/2011 | Bakker et al. |
| 2012/0260090 A1 | 10/2012 | Hauck et al. |
| 2013/0227646 A1 | 8/2013 | Haggerty et al. |

(Continued)

FOREIGN PATENT DOCUMENTS

| | | |
|---|---|---|
| EP | 2680628 A1 | 1/2014 |
| WO | 2013-085436 A1 | 6/2013 |
| WO | 2013/123233 A2 | 8/2013 |

OTHER PUBLICATIONS

"Reprogrammable SIMs: Technology, Evolution and Implications Report", Sep. 25, 2012, pp. 1-95, XP055126567.

(Continued)

*Primary Examiner* — Charles Shedrick
(74) *Attorney, Agent, or Firm* — Jefferson IP Law, LLP

(57) ABSTRACT

Provided is a technique to download and install a profile to a universal integrated circuit without receiving, from a network, an SMS for triggering reception of the profile. Specifically, a terminal according to the present invention comprises a communication unit configured to transmit and receive a signal; a control unit configured to create information for triggering reception of a profile; and a universal integrated circuit card configured to: access a profile management server and receive the profile based on the information using the communication unit, and install the received profile.

22 Claims, 23 Drawing Sheets

(51) Int. Cl.
*H04W 12/06* (2009.01)
*H04W 8/18* (2009.01)

(56) References Cited

U.S. PATENT DOCUMENTS

| | | |
|---|---|---|
| 2014/0004827 A1 | 1/2014 | O'Leary |
| 2014/0031012 A1 | 1/2014 | Park et al. |
| 2015/0163056 A1* | 6/2015 | Nix .................. H04L 9/0869 380/46 |

OTHER PUBLICATIONS

Ericsson et al., "Cleanups for WI AT_UICC", 3GPP TSG-CT WG1 Meeting #71, May 16, 2011, Tallinn, Estonia.
"Remote Provisioning Architecture for Embedded UICC Technical Specification", GSM Association Official Document 12FAST.15, Dec. 12, 2013.

* cited by examiner

FIG. 5

| | Key Version Number '00' | Key Version Number '01' | ... | Key Version Number n (maximum '0F') |
|---|---|---|---|---|
| | Reserved | Counter 1 | | Counter n |
| Key Identifier 1 | Reserved | KIc 1 | | KIc n |
| Key Identifier 2 | Reserved | KID 1 | | KID n |
| Key Identifier 3 | Reserved | DEK 1 | | DEK n |
| NOTE 1: The Key Version Number is defined in GlobalPlatform Card Specification. The range from '01' to '0F' is used in the present document. | | | | |
| NOTE 2: The Key Identifier is defined in GlobalPlatform Card Specification. The range from '01' to '03' is used in the present document. | | | | |

METHOD AND APPARATUS FOR PROVISIONING PROFILES

CROSS-REFERENCE TO RELATED APPLICATION(S)

This application claims the benefit under 35 U.S.C. § 119(a) of a Korean patent application filed on Apr. 22, 2014 in the Korean Intellectual Property Office and assigned Serial number 10-2014-0048351, the entire disclosure of which is hereby incorporated by reference.

TECHNICAL FIELD

The present invention relates generally to a method and apparatus for provisioning profiles in a mobile communication terminal in connection with a Universal Integrated Circuit Card (UICC) which is a smart card security module inserted in the terminal. More particularly, the present invention relates to a method such as remotely installing or deleting mobile communication subscriber information in or from an embedded UICC (eUICC) which replaces the UICC and is embedded in a non-removable form in the terminal.

BACKGROUND

The UICC, inserted in a mobile communication terminal and used as a smart card, has personal information about a mobile communication subscriber, such as network access certification information, a phonebook, and SMS, stored therein. At the time of attachment to a mobile communication network such as GSM, WCDMA, or LTE, the UICC performs subscriber identification and traffic security key creation and thus allows a safe use of the mobile communication. The UICC has a communication application, e.g., Subscriber Identification Module (SIM), Universal SIM (USIM), CDMA SIM (CSIM), removable user identity card (R-UIM) or IP multimedia SIM (ISIM), mounted therein depending on the type of the mobile communication network, and also provides an upper-level security function for mounting various applications such as electronic wallet, ticketing, and electronic passports.

A typical UICC is manufactured and launched as a dedicated card for a specific mobile network operator at the request of the operator, having therein authentication information (e.g., USIM application and IMSI, K value) for access to the operator's network. Therefore, the specific mobile network operator offers such UICCs to subscribers and then, if necessary, performs management such as installation, modification and deletion of applications within the UICC by using OTA (Over The Air) technology. The subscribers can use the operator's network and application services by inserting the UICC into their own mobile terminals. Further, by moving the UICC from an old terminal to a new terminal in case of the change of terminals, it is possible to still use, in the new terminal, authentication information, mobile phone numbers, personal phone number, etc. stored in the UICC.

European Telecommunications Standards Institute (ETSI) defines a physical form and logical function of UICC to maintain international compatibility. In view of a form factor that defines a physical form, the UICC has been gradually decreased in size from Mini SIM widely used, via Micro SIM used since several years ago, to Nano SIM used recently. However, UICC sized smaller than Nano SIM can be hardly standardized due to increasing risk of loss. Further, since the UICC of removable types requires space for forming an insertion slot in the terminal, additional scale down is expected to be in trouble.

Also, such a removable type UICC is not suitable for Machine-to-Machine (M2M) devices that require access to a mobile communication data network without human's direct manipulation in various installation circumstances such as smart home appliances, electric/water meters, CCTV cameras, and the like.

In order to obviate such problems, it is required to embed a security module, being similar in function to UICC, in a mobile communication terminal at the manufacture of the terminal to replace a typical removable UICC. However, because this security module is mounted in a non-removable form within the terminal at the manufacture, it is impossible to mount in advance network access authentication information, such as IMSI or K of USIM, of a specific mobile network operator at the manufacture of the terminal. Therefore, a user who purchases this terminal can set up such authentication information only after joining the specific operator.

Additionally, contrary to a typical UICC which is manufactured and launched only for a specific mobile network operator, a newly introduced eUICC embedded in the terminal should safely, flexibly install and manage authentication information about various mobile network operators according as a user joins or leaves a specific mobile network operator or changes to other operator.

Meanwhile, the eUICC profile installation method proposed in GSM eUICC Technical Specification V1.0 published in December, 2013 may have some problems, as follows.

First, if a user subscribes for a mobile communication service, the Operational Profile issued by the mobile network operator should be downloaded and installed in the eUICC by means of OTA (Over The Air). Further, such OTA download of the Operational Profile requires triggering by SMS transmitted from the network to the terminal. Namely, in order to download the Operational Profile to the eUICC using OTA, the terminal should attach to the mobile network and thereby be in a state of being capable of receiving SMS and downloading the Operational Profiles through the mobile network.

By the way, in order to receive such OTA triggering SMS and download the Operational Profile, a profile required for attachment to any mobile network in any nation should have been already mounted in the eUICC before a customer joins a specific mobile network operator (referred to as Provisioning Profile in standard terms).

The Provisioning Profile has to be mounted at the manufacture of the eUICC. However, it is uncertain in which country the terminal to be manufactured with such eUICC chip will be used. It is therefore required to determine a mobile network operator and a nation of the Provisioning Profile to be mounted in the eUICC.

SUMMARY

The present invention is to provide a technique to download and install a profile to a universal integrated circuit without receiving, from a network, an SMS for triggering reception of the profile. In accordance with an aspect of the present invention, a terminal comprises a communication unit configured to transmit and receive a signal; a control unit configured to create information for triggering reception of a profile; and a universal integrated circuit card configured to: access a profile management server and receive the profile based on the information using the communication unit, and install the received profile.

BRIEF DESCRIPTION OF THE DRAWINGS

FIG. 5 is a diagram illustrating a key version number defined in ETSI TS 102.225 standard.

DETAILED DESCRIPTION

Hereinafter, various embodiments of the present invention will be fully described with reference to the accompanying drawings. This invention may, however, be embodied in many different forms and should not be construed as limited to the embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

In this disclosure, a profile may refer to software-type packaging of information contained in an UICC, i.e. applications, a file system, an authentication key value, etc. stored in the UICC.

A USIM profile may have the same meaning as a profile or refer to software-type packaging of information contained in a USIM application within a profile.

An operational profile may refer to software-type packaging of subscriber information of a mobile network operator to which a user of a terminal subscribes.

A provisioning profile may refer to a profile mounted in advance in eUICC and required for attaching to any mobile communication network of any nation before a user subscribes to a specific mobile network operator.

Additionally, in this disclosure, a profile providing server may be referred to as a profile provider or an SM-DP (Subscription Manager-Data Preparation), and a profile management server may be referred to as a profile manager or an SM-SR (Subscription Manager-Secure Routing).

Also, as understood by those skilled in the art, a control unit and a controller used herein may have the same meaning.

Figure 1:
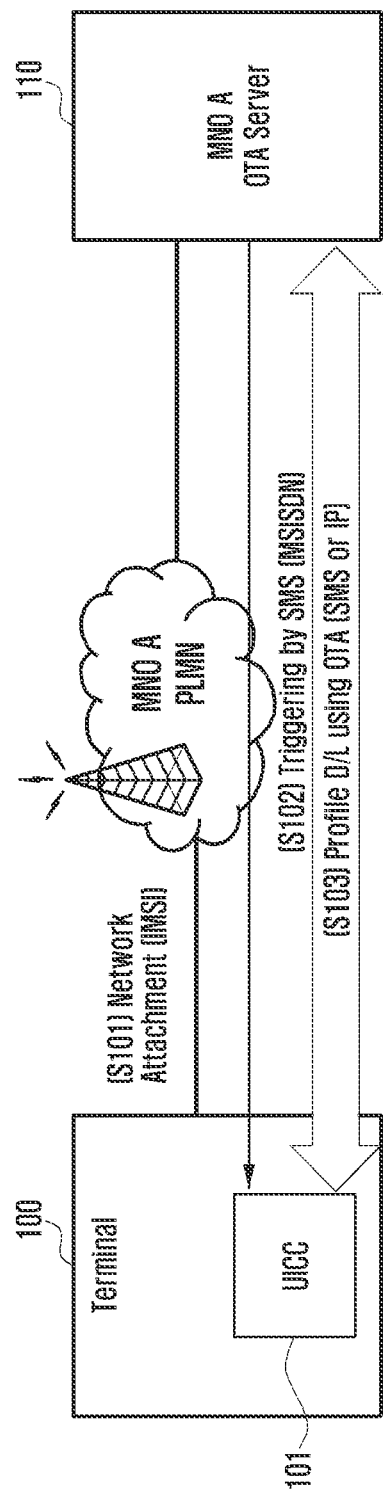
FIG. 1 is a diagram illustrating OTA technology for a typical removable UICC.

FIG. 1 is a diagram illustrating OTA technology for a typical removable UICC.

The removable card which can be inserted into and removed from a terminal 100 may be sold in the form of having mounted therein certification information (IMSI, K, etc.) allowing the attachment to a network of specific mobile network operator. Therefore, the removable card may be used only for the specific mobile network operator until it is discarded. The UICC 101 may not only have a communication application, such as SIM, USIM, or ISIM, mounted therein depending on the type of a mobile communication network, but also have other various applications, such as mobile credit cards, mobile wallet, or electronic passports, mounted therein. In this case, OTA technology may be used for convenient management such as installing, modifying or deleting applications in the UICC card inserted in the terminal.

In FIG. 1, when the terminal 100 is attached to a network of mobile network operator A (hereinafter, referred to as MNO A) (S101), the network may recognize the attachment of the terminal 100 and trigger OTA management by transmitting an SMS to the terminal 100 at an OTA server 110 of the MNO A (S102).

The OTA server 110 may be operated by each MNO and provide, using OTA, services of installing, modifying or deleting applications in the UICC 101.

In order to allow the OTA server 110 to perform OTA management of the UICC 101 in the terminal 100, the network is required to recognize the attachment of the terminal 100. Further, for triggering OTA management via the network, the terminal 100 has to be in a state capable of directly receiving SMS.

Figure 2:
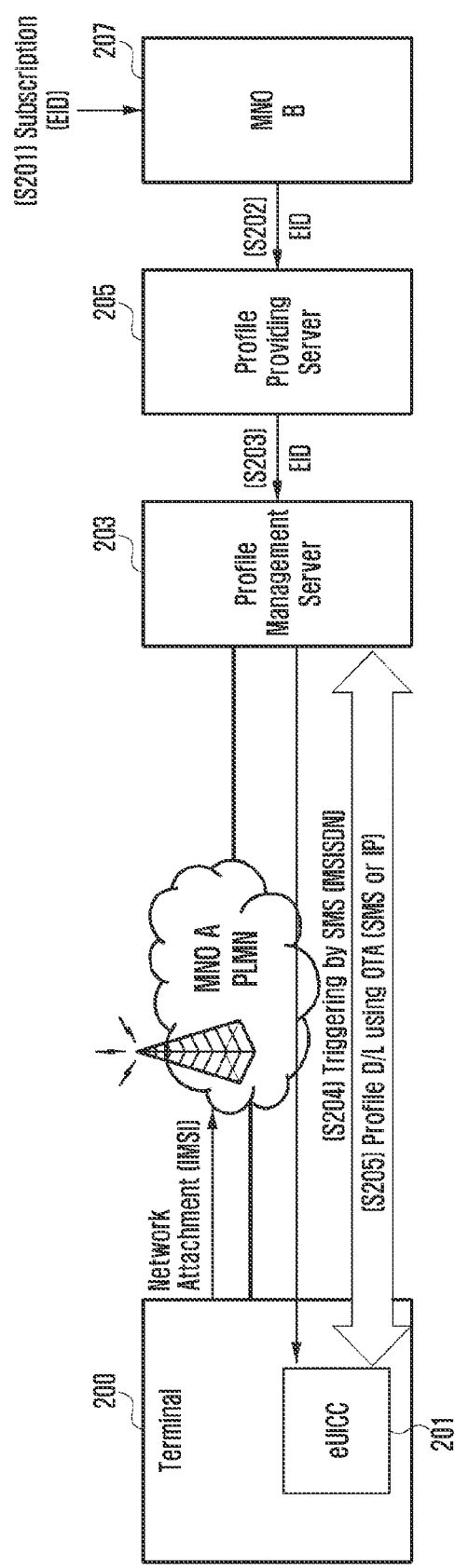
FIG. 2 is a diagram illustrating OTA technology applied to a terminal having an eUICC mounted therein.

FIG. 2 is a diagram illustrating OTA technology applied to a terminal having an eUICC mounted therein.

The eUICC 201 may install a profile through a profile download using OTA technology. The eUICC 201 comprises at least one of a non-removable (ex. embedded) security module or removable security module. The eUICC 201 comprises chip-type security module.

Now, a case of applying OTA technology to the terminal 200 having the eUICC 201 therein similar as shown in FIG. 1 will be described in detail.

When the user joins MNO B 207, the MNO B 207 can acquire EID information of the user terminal 200 (S201). EID (eUICC Identifier) is an identifier which is uniquely assigned to each eUICC and is an unchangeable value. The MNO B 207 transfers the EID of the user terminal 200 to a profile providing server 205 (S202). Then, the profile providing server 205 creates and encrypts a profile corresponding to the EID and transfers the profile to a profile management server 203 that manages the EID and the eUICC 201 (S203).

The terminal 200 may request profile download and installation from the profile management server 203 using OTA technology (S205).

The profile management server 203 transmits SMS for a profile download to the terminal 200 having the eUICC 201 therein (S204). Since the profile download is triggered using SMS, the terminal 200 should attach, in advance, to the mobile network before transmission of SMS. As shown in FIG. 2, the user may attach in advance to the mobile network of MNO A even though he or she has now joined MNO B and wants to download the profile for MNO B. This attachment is determined according to the Provisioning Profile which has been already provided to the terminal 200 and may be identical to or different from a profile of MNO the user desires to join and use.

A recipient phone number for the SMS transmitted to the terminal 200 is at least a part of the Provisioning Profile contained in the eUICC 201. The profile management server 203 may be previously aware of a Provisioning Profile phone number of eUICC being managed.

The terminal 200 may transfer the received SMS to the eUICC 201 contained therein. The eUICC 201 may establish a secure channel with the profile management server 203 and/or the profile providing server 205 through a modem (i.e. a communication unit) in the terminal 200 and download the Operational Profile from the profile providing server 205.

Figure 3:
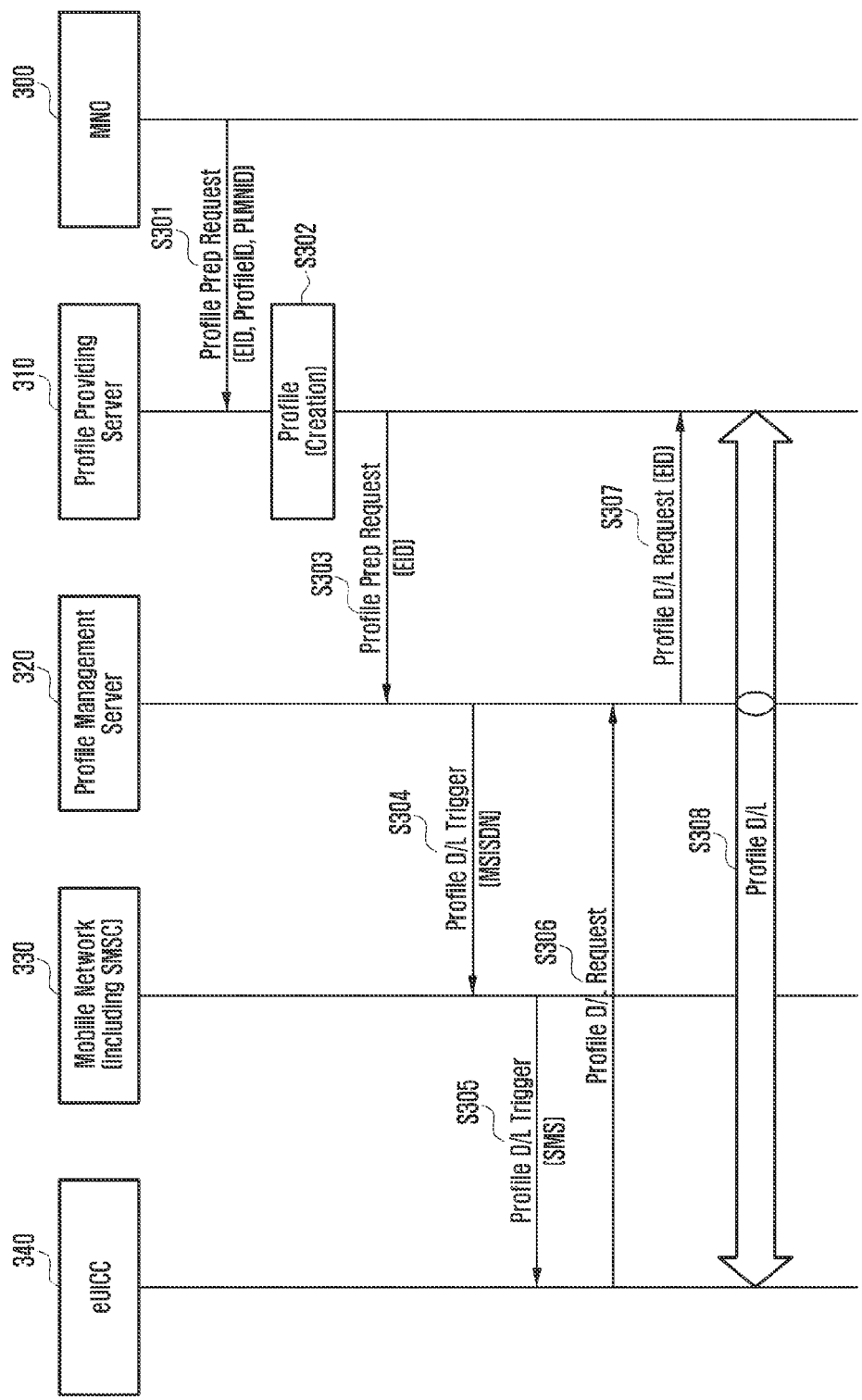
FIG. 3 is a diagram illustrating, as a message flow between respective modules, OTA technology applied to a terminal having the eUICC mounted therein.

FIG. 3 is a diagram illustrating, as a message flow between respective modules, OTA technology applied to a terminal having the eUICC mounted therein.

Referring to FIG. 3, at step S301, the MNO 300 transfers a profile preparation request (namely, Profile Prep Request) to the profile providing server 310. This Profile Prep Request may contain EID, ProfileID, PLMNID, etc. of the user terminal. The ProfileID may use an ICCID value which is used as an identifier of a typical UICC card.

At step S302, the profile providing server 310 creates a profile to be provided to the eUICC 340 on the basis of information received from the MNO 300.

At step S303, the profile providing server 310 may transfer the Profile Prep Request to the profile management server 320. This Profile Prep Request may contain EID and ICCID of the terminal. Additionally, at step S303, the profile providing server 310 may also transfer a profile, created by the profile providing sever 310, together with the Profile Prep Request, and the profile management server 320 may store therein the profile transferred.

At step S304, the profile management server 320 may trigger a profile download (namely, Profile D/L Trigger) by transmitting SMS to the terminal having the eUICC 340 through the mobile network 330. This SMS transmission may use MSISDN (i.e. a phone number) of the Provisioning Profile contained in the eUICC.

At step S305, an SMSC (Short Message Service Center) in the mobile network 330 may transmit SMS to the terminal having the eUICC. This SMS may be triggering for a profile download (namely, Profile D/L Trigger).

At step S306, the eUICC 340 may receive the SMS and then transmit a profile download request (namely, Profile D/L Request) to the profile management server 320 through the modem (namely, the communication unit) of the terminal. At step S307, the profile management server 320 may transfer the received Profile D/L Request to the profile providing server 310. The profile management server 320 may have already received the created profile from the profile providing server 310 at the previous step S303, or alternatively may receive an encrypted profile at this step S307 by sending the Profile D/L Request to the profile providing server 310.

At step S308, the eUICC 340 may establish a secure channel with the profile management server 320 and download the created profile from the profile providing server 310.

Figure 4:
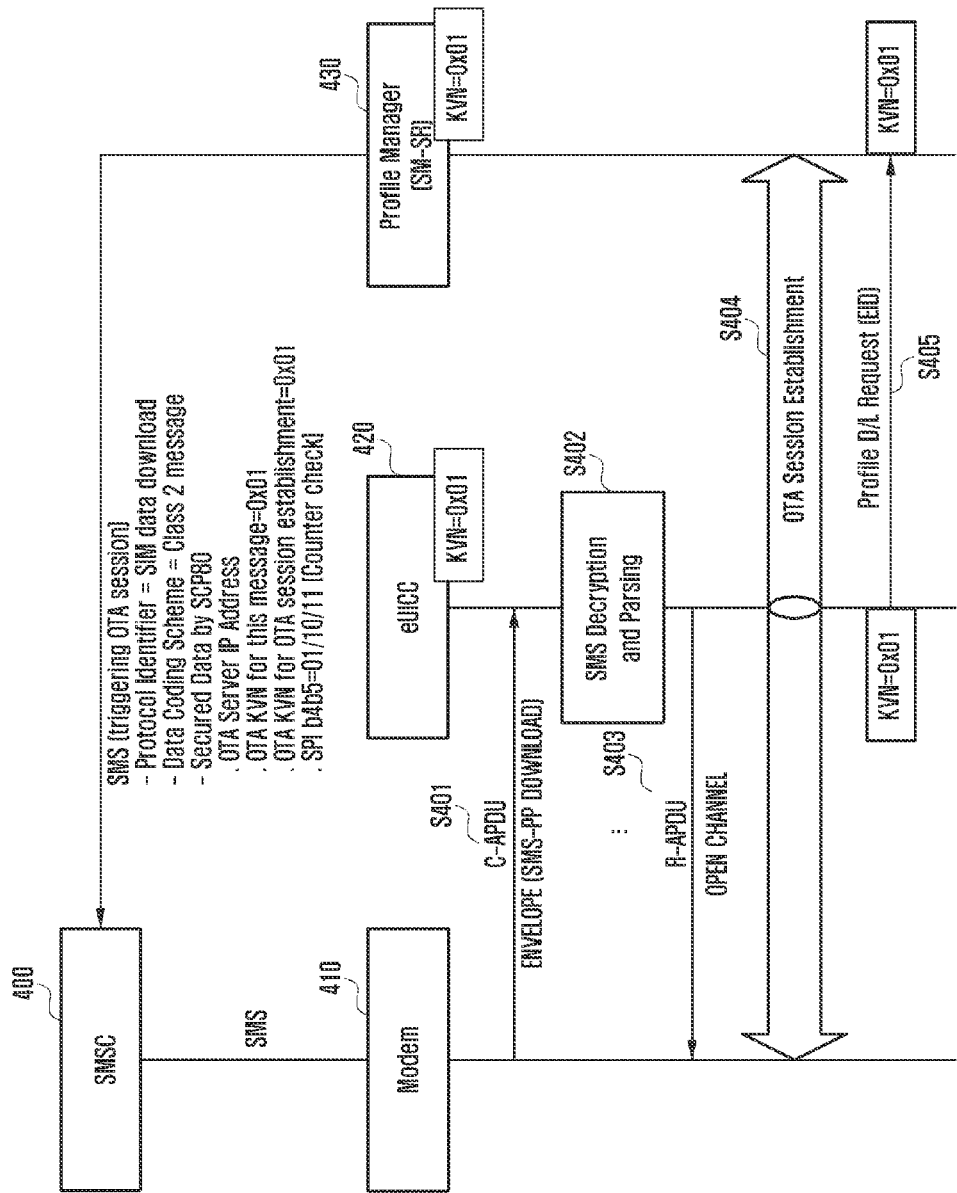
FIG. 4 is a diagram illustrating a method for downloading a profile in the eUICC by using SMS.

FIG. 4 is a diagram illustrating a method for downloading a profile in the eUICC by using SMS.

FIG. 5 is a diagram illustrating a key version number defined in ETSI TS 102.225 standard.

Referring to FIGS. 4 and 5, the SM-SR 430 that receives a profile installation request from the SM-DP creates SMS for triggering an OTA session at a target eUICC 420 and transmits the created SMS to a target terminal through the SMSC 400. At this time, an SMS recipient phone number may be an MSISDN value contained in the Provisioning Profile. According to the 3GPP standards, the Protocol Identifier of SMS header is set to "SIM data download", and the Data Coding Scheme is set to "Class 2 message". Further, a communication unit, i.e. a modem device 410, of the terminal receiving the SMS is required to transmit SMS information directly to the eUICC 420. The data field in SMS is certificated and encrypted using the Secure Channel Protocol, e.g. named SCP80, and the Key Version Number (KVN) of a certification and encryption key used at this time may use one of fifteen KVNs, 0x01~0x0F, defined in the ETSI TS 102.225 standard. FIG. 4 supposes the use of 0x01 which is widely used in the industrial world.

At step S401, the modem 410 receiving SMS may transfer the SMS to the eUICC 420 in the form of C-APDU (Command Application Protocol Data Unit) packet defined in the ISO-7816 standards. The C-APDU for this purpose is referred to as ENVELOPE (SMS-PP DOWNLOAD) and defined as a method for triggering the OTA session by using SMS in the 3GPP standards.

At step S402, the eUICC 420 receiving the ENVELOPE (SMS-PP DOWNLOAD) C-APDU extracts the SMS by parsing the received C-APDU and decrypts the data field of the SMS with its own OTA key.

The decrypted data may contain the IP address of the SM-SR server and a KVN value of the OTA key value for establishing the OTA session with the SM-SR server. For OTS session establishment with the SM-SR 430 using this, the eUICC 420 may transmit OPEN CHANNEL R-APDU to the modem 410 at step S403.

Therefore, the OTA session between the eUICC and the SM-SR server is established at step S404, and the eUICC downloads a profile through this session at step S405. FIG. 4 shows a case in which the OTA session uses the same KVN1 as used for encrypting the SMS.

Figure 6:
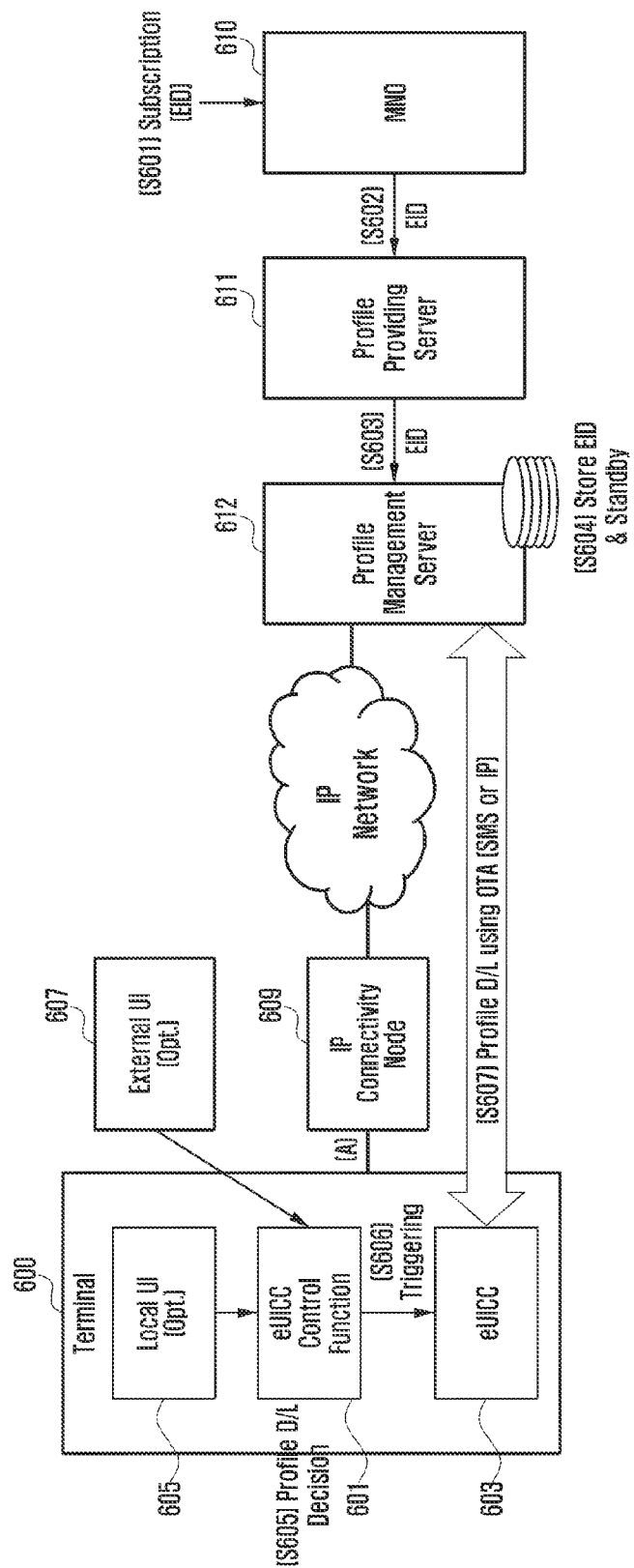
FIG. 6 is a block diagram illustrating elements for performing a method for storing a profile in accordance with an embodiment of the present invention.

FIG. 6 is a block diagram illustrating elements for performing a method for storing a profile in accordance with an embodiment of the present invention.

In FIG. 6, a process in which the profile providing server 611 receives EID from the MNO 610 (S602), creates a profile, and provides the profile to the profile management server 612 (S603) is the same as discussed earlier in FIGS. 2 and 3. Therefore, a related description will be omitted hereinafter.

The following description will be focused on the difference between FIG. 6 and FIGS. 2 and 3.

In case of a profile download method and apparatus according to one embodiment of this invention, a normal IP network may be used instead of using SMS on the mobile network when the profile management server 203 in FIG. 2 triggers a profile download of eUICC in the terminal.

Namely, the terminal 600 may attach the IP network through the IP connectivity node 609 instead of the network (i.e. PLMN) of MNO and, using the IP network, transfer a signal for a profile download to the profile management server 612 (S607). In this case, since the terminal 600 has to attach to the IP network through the IP connectivity node 609, such a node that provides IP connections should exist around the terminal 600. In this embodiment, the IP connectivity node 609 may be a Wi-Fi AP (Access Point), a handset device, a personal computer, and the like. Additionally, the layer-2 interface (A) between the terminal 600 and the IP connectivity node 609 may be Wi-Fi, Bluetooth, NFC, USB cable, and the like.

When a profile download command is received from the profile providing server 611, the profile management server 612 triggers a profile download by transmitting SMS to the terminal through the mobile network in FIG. 3. However, in FIG. 6, the profile management server 612 stores profile information (e.g., EID) in the internal memory or database and may be in a standby state of waiting for a profile download request from the terminal (S604).

In this embodiment, triggering of a profile download may be performed automatically in the terminal 600 or in response to a user's choice rather than performed at the MNO 610, the profile providing server 611, and the profile management server 612.

Therefore, although there is a profile download request from the profile providing server 611, the profile management server 612 may wait until the terminal 600 fetches autonomously (fetch key value: EID).

In this embodiment, a profile download decision (S605) may be implemented in various ways.

Specifically, the controller 601 may determine autonomously a new profile download. In this case, if there is no Operational Profile in the eUICC 603 and if the terminal 600 is connected to the IP connectivity node 609, a new profile download may be triggered (S606).

Alternatively, the user may determine a new profile download through a UI (User Interface) of the terminal 600.

Alternatively, an external UI 607 located at the outside of the terminal 600 may transfer a profile download command to the controller 601. In this case, the external UI 607 refers to UI software of any other terminal connected to the terminal 600 through USB cable, Bluetooth, WiFi, or the like.

Now, in case the controller 601 triggers a new profile download at the eUICC 603, an interface between the controller 601 and the eUICC 603 and an interface between the controller 601 and the profile management server 612 will be described in detail.

Although the terminal 600 does not receive an SMS, the interface between the controller 601 and the eUICC 603 may communicate by virtual SMS transmission as if receiving SMS, using existing APDU, SMS-PP, and AT-Command standards.

Alternatively, the interface between the controller 601 and the eUICC 603 may be implemented using a newly defined APDU Command. In this case, parameters to be used may be OTA Key information and the IP address of the profile management server 612.

The interface between the eUICC 603 and the profile management server 612 may use existing OTA standards (SCP80 or SCP81). This has an advantage of minimizing a change in existing standard and infrastructure.

In case the eUICC 603 downloads a profile from the profile management server 612 using OTA (S607), the profile management server 612 may not have received yet information about a profile created by the profile providing server 611, the profile providing server 611 may not have created a profile yet, or the MNO 610 may not have transferred yet information including EID to the profile providing server 611.

In such a case, the profile management server 612 may maintain the SCP 80 or 81 Session established with the eUICC 603 and then perform a profile download as soon as the profile providing server 611 provides a created profile or profile information such as EID to the profile management server 612.

According to this scheme, the terminal 600 may periodically transmit a profile download request to the profile management server 612, so that overload or delay in a profile download may be prevented.

Figure 7:
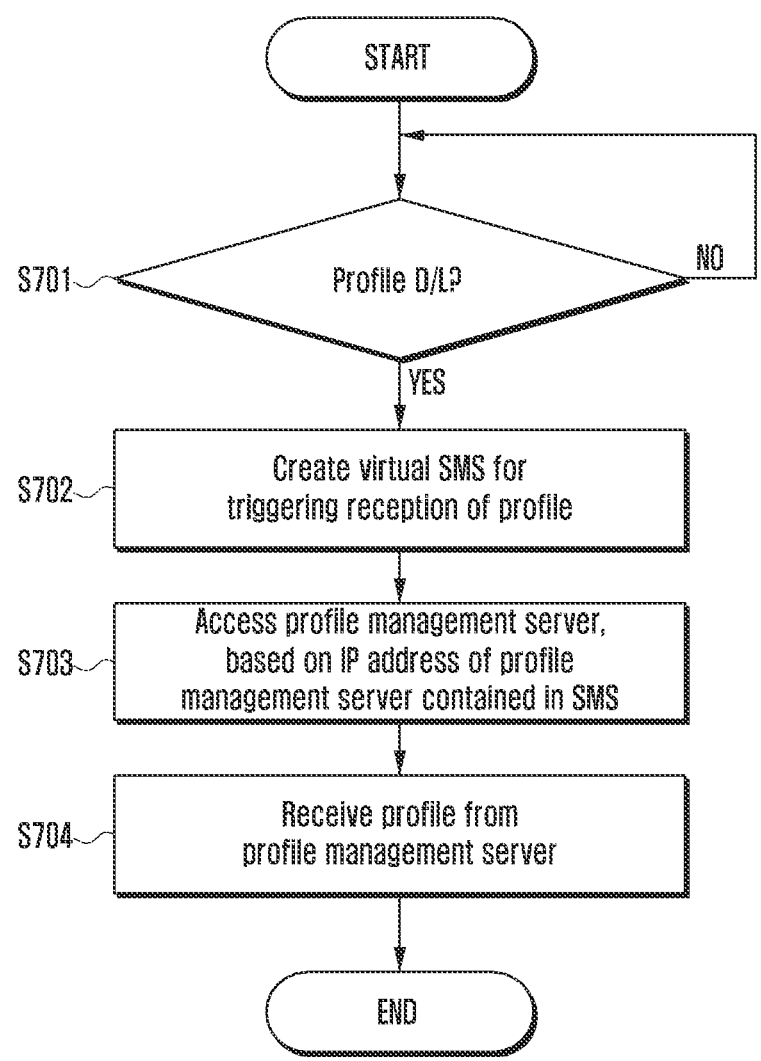
FIG. 7 is a flow diagram illustrating a method for installing a profile at a terminal in accordance with an embodiment of the present invention.

FIG. 7 is a flow diagram illustrating a method for installing a profile at a terminal in accordance with an embodiment of the present invention.

Referring to FIG. 7, at step S701, the terminal may determine whether to download a profile. There are various ways of determining whether to download a profile. First, the controller may determine automatically a new profile download. In this case, if there is no Operational Profile in the eUICC and if any IP network connectivity of the terminal is ascertained, a new profile download may be triggered. Alternatively, the user may determine in person a new profile download through a UI of the terminal.

Alternatively, the external UI located at the outside of the terminal may transfer a profile download command to the controller. In this case, the external UI refers to UI software of any other terminal connected to the terminal through USB cable, Bluetooth, WiFi, or the like.

When it is determined to download a profile, the controller of the terminal may create a virtual SMS for triggering reception of a profile at step S702. This creation of the virtual SMS may be referred to as SMS emulation. Specifically, the SMS emulation is to create SMS at the controller in place of SM-SR and SMSC, to convert it in the form of ENVELOPE (SMS-PP DOWNLOAD) C-APDU, to transfer the ENVELOPE (SMS-PP DOWNLOAD) C-APDU to the modem (i.e., the communication unit) through the AT command, and to allow the modem to transfer it to the eUICC.

After the SMS emulation is performed, the eUICC of the terminal may certificate and decrypts the SMS. At step S703, if the data field of the certificated SMS contains the IP address of the profile management server, the eUICC may access the profile management server on the basis of contained information such as the IP address of the profile management server. Otherwise, the eUICC may access the profile management server, using the IP address stored in the eUICC. At step S704, the eUICC may start a session for OTA with the profile management server and transmit a profile download request message to the profile management server.

Figure 8:
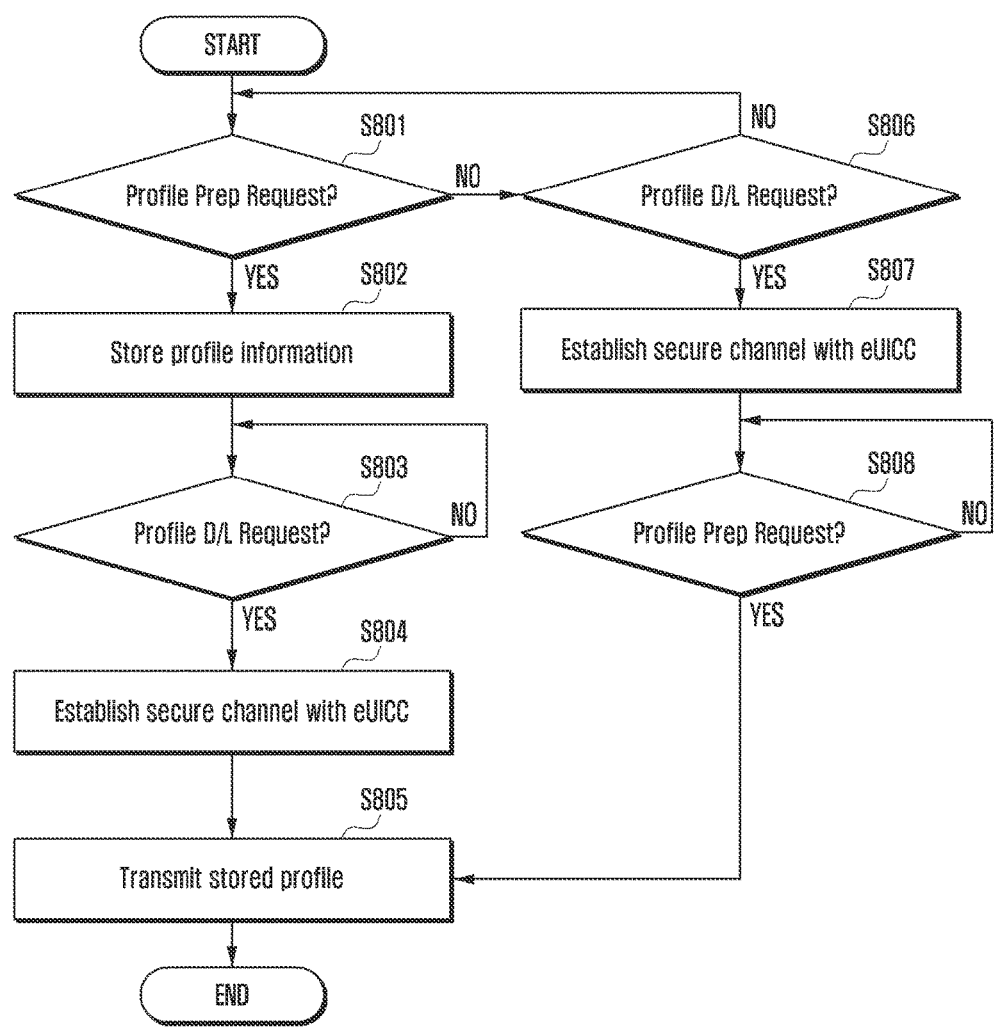
FIG. 8 is a flow diagram illustrating a method for providing a profile at a profile management server in accordance with an embodiment of the present invention.

FIG. 8 is a flow diagram illustrating a method for providing a profile at a profile management server in accordance with an embodiment of the present invention.

Referring to FIG. 8, at step S801, the profile management server may determine whether there is a profile preparation request message (namely, Profile Prep Request) from the profile providing server.

If there is a Profile Prep Request at step S801, the profile management server may store therein, at step S802, terminal EID information received from the profile providing server and be on standby. Additionally, the profile management server may store therein a created profile from the profile providing server. However, the profile management server may receive the created profile from the profile providing server when the Profile Prep Request is received initially, or receive the profile later when a profile download request is transferred to the profile providing server in case there is the profile download request from the eUICC.

At step S803, the profile management server may determine whether there is a profile download request (namely, Profile D/L Request) from the eUICC of the terminal. If there is no Profile D/L Request from the eUICC, the profile management server is on standby since the Profile D/L Request is not triggered yet at the terminal.

If there is the Profile D/L Request from the eUICC of the terminal, the profile management server may establish the secure channel with the eUICC at step S804 and transmit to the eUICC, at step S805, a profile received from the profile providing server and stored, or alternatively transferred from the profile providing server in real time.

Meanwhile, the Profile D/L Request may arrive first from the eUICC of the terminal at step S806 even though there is no Profile Prep Request from the profile providing server at step S801. According to one embodiment of this invention, since the terminal determines autonomously triggering for a profile download without depending on SMS, the profile management server may not yet contain information about the profile even though the Profile D/L Request for a profile download arrives.

When there is the Profile D/L Request from the eUICC of the terminal, the profile management server may establish the secure channel with the eUICC of the terminal at step S807 even before the created profile or the Profile Prep Request arrives from the profile providing server. In case such a channel is not established first, there may be a periodic Profile D/L Request from the terminal and any delay may occur accordingly. It is therefore desirable that the profile management server establishes the secure channel with the eUICC of the terminal even before the created profile or the Profile Prep Request arrives from the profile providing server.

After establishing the channel, the profile management server may determine at step S808 whether there is the created profile or the Profile Prep Request from the profile providing server. If there is no created profile or no Profile Prep Request, the profile management server may be on standby.

Thereafter, if the created profile or the Profile Prep Request is transferred to the profile management server from the profile providing server, the profile management server may transmit the received profile to the eUICC at step S805 since the secure channel has been already established between the eUICC and the profile management server at step S807.

Figure 9A:
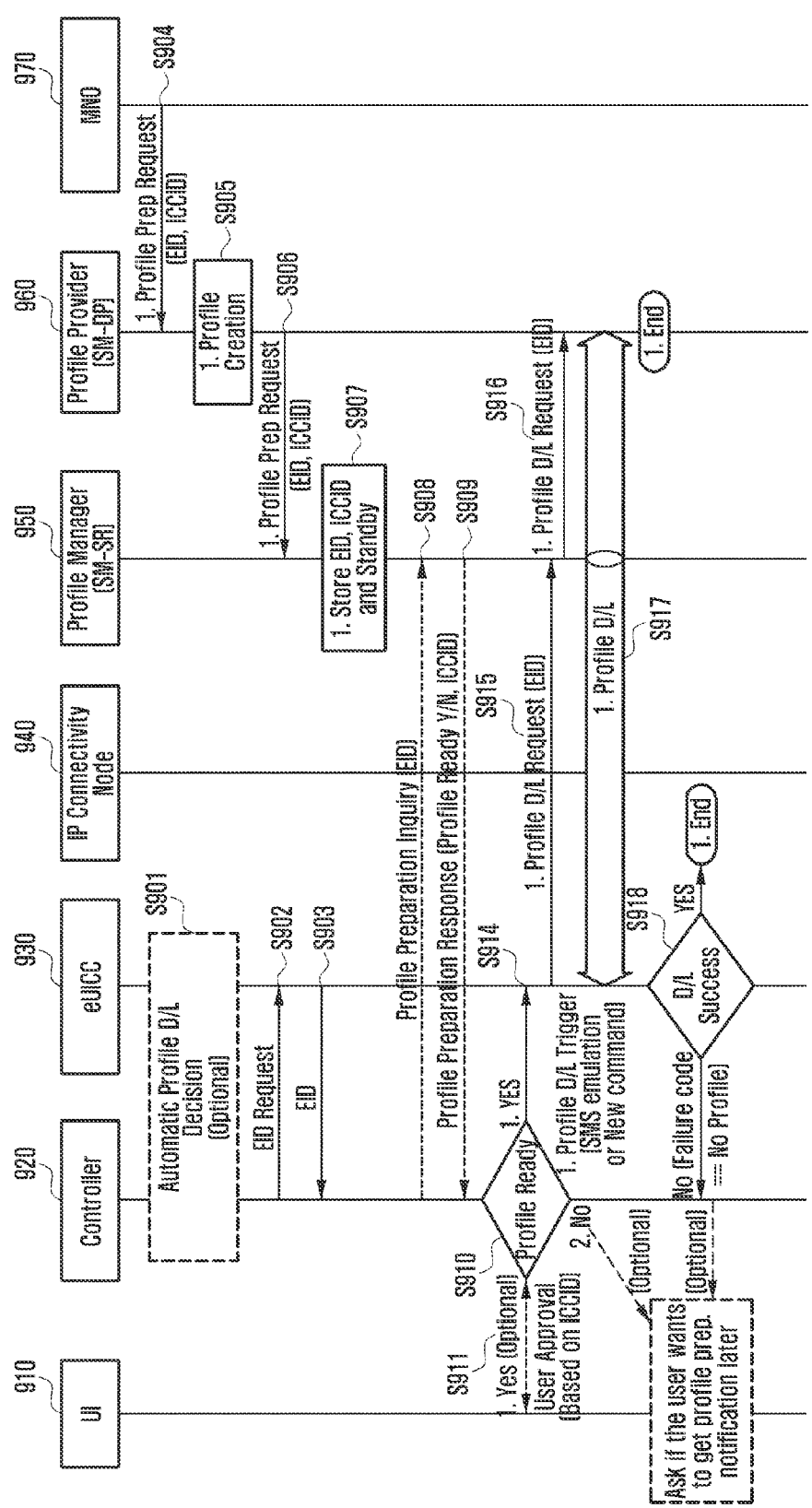
FIGS. 9A and 9B are diagrams illustrating an overall message flow of a method for installing a profile in accordance with an embodiment of the present invention.
Figure 9B:
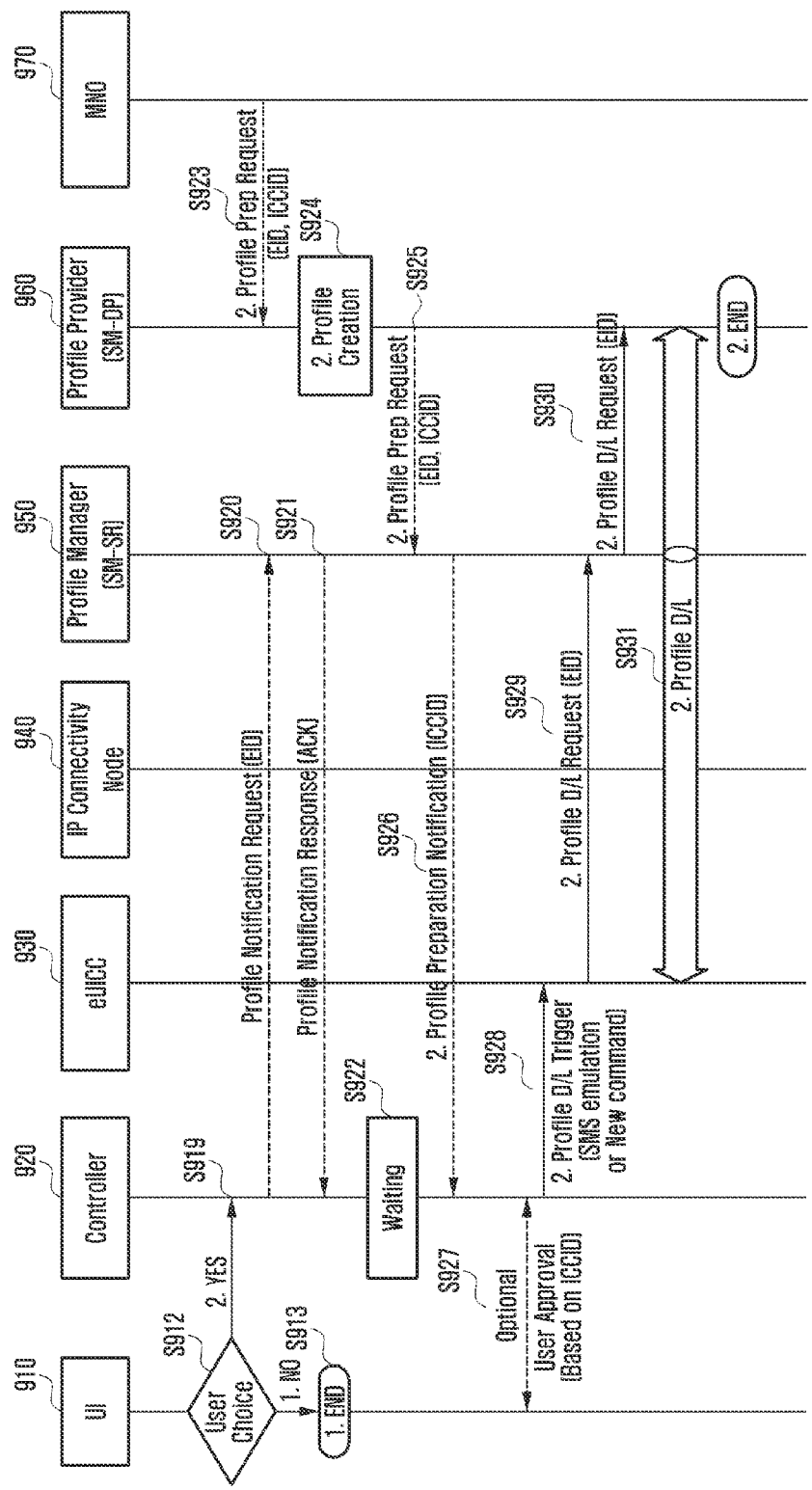

FIGS. 9A and 9B are diagrams illustrating an overall message flow of a method for installing a profile in accordance with an embodiment of the present invention.

Referring to FIGS. 9A and 9B, when the terminal attempts a profile download, the profile may have already been created and thus related information may have already been transferred to the profile manager 950 (namely, SM-SR), or alternatively the profile may not yet be created. In the former case, a profile download is allowed immediately. In the latter case, it is required to wait for the creation of the profile.

According to an embodiment of this invention, it is possible at a profile download to provide the UI 910 of the user terminal with information about which MNO's profile is prepared for a download in the profile manager 950. Therefore, the user may determine whether to download the profile.

According to an embodiment of this invention, if there is no preparation of profile in the SM-SR 950 when the terminal performs a profile download request, it is possible to end a profile download procedure by terminating a communication session between the terminal and the profile manager. Alternatively, it is possible to maintain the communication session and download a profile as soon as the profile is prepared in the profile manager.

In this case, the user may be allowed to determine through the UI 910 of the terminal whether to terminate the communication session between the terminal and the profile manager. Alternatively, based on predefined setting, the terminal may determine autonomously whether to terminate the session without inquiry to the user.

Hereinafter, the above-mentioned embodiments will be described in detail with reference to FIGS. 9A and 9B.

At step S901, the terminal may determine whether to perform an automatic profile download. This step will be more fully described in FIG. 10.

The controller 920 may send an EID request to the eUICC 930 at step S902, and the eUICC 930 may provide EID to the controller 920 at step S903.

Meanwhile, at step S904, the MNO 970 transmits the Profile Prep Request, including EID and ICCID information, to the profile provider 960. Then the profile provider 960, i.e. the profile providing server, may create a profile at step S905. Additionally, at step S906, the profile provider 960 may transfer the Profile Prep Request, received from the MNO 970, to the profile manager 950, i.e. the profile management server.

At step S907, the profile manager 950 may store therein EID and ICCID and be on standby until a profile download request is received from the terminal.

At step S908, the controller 920 may inquire about a profile download preparation for EID by sending an EID value to the profile manager 950. At step S909, the profile manager 950 transmits a response to the controller 920. In case a profile download is prepared, an ICCID value of the prepared profile may be transmitted to the controller 920.

Additionally, in case the profile download is prepared, the controller 920 may allow, at step S911, the user to determine through the UI 910 whether to download the prepared profile, or alternatively perform a direct profile download procedure at step S914.

If a profile download is not prepared, the controller 920 may transmit a notification request to the profile manager 950 at step S920 and wait at step S922, or may immediately terminate a profile download procedure. In the above, the notification request is for receiving a notification from the profile manager 950 and triggering a profile download request when a profile download is prepared in the profile manager 950. In case a profile download is not prepared, determination whether to wait for a notification or immediately terminate the procedure may be performed according to a predefined logic at the controller 920 or alternatively performed in response to a user's choice through the UI 910 at step S912.

Returning to step S914, the controller 920 may transmit a profile download triggering signal to the eUICC 930. This embodiment may use, as a triggering method, SMS emulation or defining a new APDU command.

The eUICC 930 may transmit the Profile D/L Request to the profile manager 950 at step S915, and then the profile manager 950 may transfer the same Profile D/L Request to the profile provider 960 at step S916.

At step S917, the OTA session for a profile download is created between the eUICC 930 and the profile manager 950. The eUICC 930 may download a profile from the profile manager 950 in case the profile is stored in the profile manager 950, or from the profile provider 960 through the profile manager 950 in case the profile is not stored in the profile manager 950.

At step S918, the eUICC 930 may determine whether a profile download succeeds.

Referring to FIG. 9B, at step S920, the controller 920 may transmit a Profile Notification Request to the profile manager 950 so as to notify the profile manager 950 that the terminal has already performed a task for a profile download and is ready for immediately performing a download when a profile is prepared. At step S921, the profile manager 950 may transmit a response (ACK) to the controller 920. At step S922, the controller 920 receives the ACK and waits.

Steps S923 to S925 are the same as the above-discussed steps S904 to S906, so that detailed descriptions thereof will be omitted.

At step S926, the profile manager 950 may transmit a Profile Preparation Notification to the controller 920 which is waiting. Then the controller 920 may optionally obtain a user's approval at step S927 and trigger a profile download at step S928. The following steps of downloading a profile at the eUICC 930 are the same as the above-discussed steps S915 to S917, so that detailed descriptions thereof will be omitted.

Figure 10:
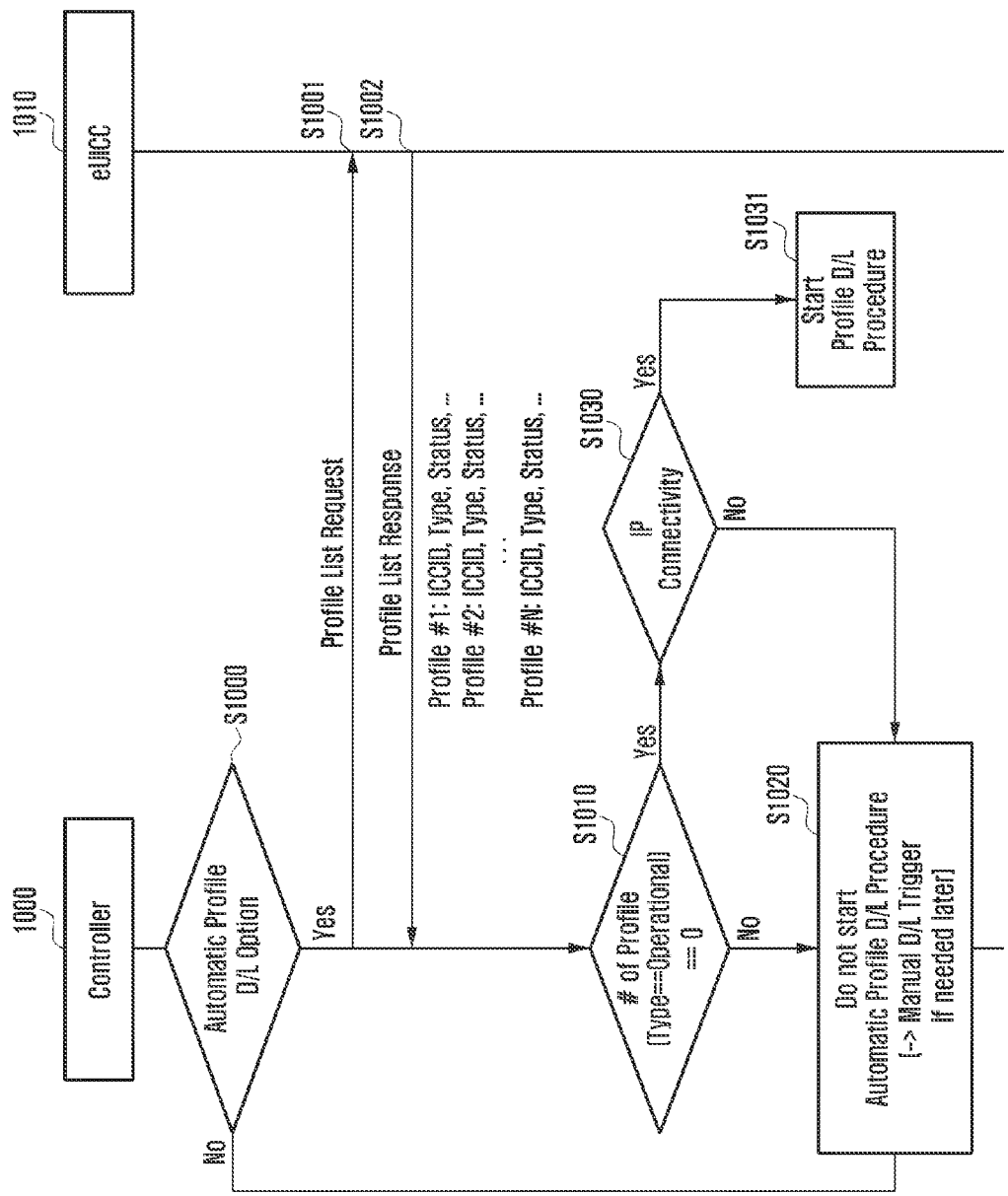
FIG. 10 is a flow diagram illustrating a method for determining an automatic profile download at a controller.

FIG. 10 is a flow diagram illustrating a method for determining an automatic profile download at a controller.

Referring to FIG. 10, at step S1000, the controller 1000 may determine whether to perform an automatic profile download option.

If this option is not performed, a manual profile download procedure may be performed at step S1020 if needed later.

In case of performing an automatic profile download at step S1000, the controller 1000 transmits a message of requesting a stored profile list to the eUICC 1010. When the stored profile list is received from the eUICC 1010 at step S1002, the controller 1000 may determine at step S1010 whether profile types in the profile list contain the Operational Profile which indicates a specific profile of a mobile network joined by the user.

Namely, the controller 1000 may send a request for a list of installed profiles to the eUICC 1010 and check, from the received profile list, the number of profiles having the type of Operational Profile. If this number is zero, the controller 1000 may start a profile download procedure, judging that a download of a new profile is needed. If there is the Operational Profile of MNO joined by the user in the eUICC 1010, the controller 1000 may determine not to perform a profile download. If there is no Operational Profile, the controller 1000 may determine at step S1030 whether the terminal can access the IP network.

If there is IP connectivity, namely if access to the profile management server is allowed through the IP network, the controller 1000 starts a profile download procedure at step S1031.

If there is no IP connectivity, the controller 1000 may do not start an automatic profile download procedure at step S1020 and then trigger a manual profile download if needed later.

Figure 11:
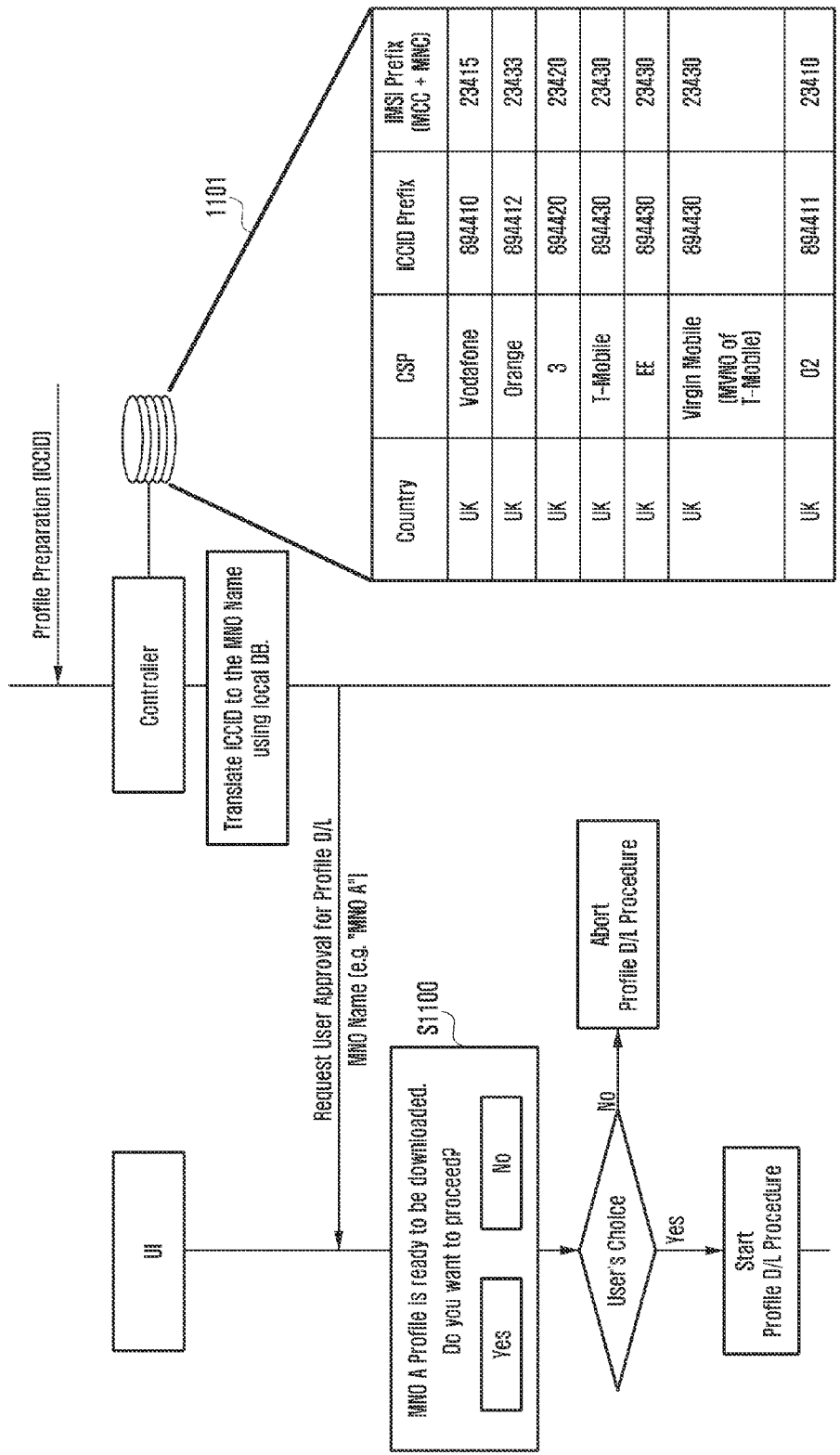
FIG. 11 is a diagram illustrating a procedure of downloading a profile according to a user's choice in case a profile download is prepared in a profile management server.

FIG. 11 is a diagram illustrating a procedure of downloading a profile according to a user's choice in case a profile download is prepared in a profile management server.

Referring to FIG. 11, it is required to previously store, in a storage unit of the terminal, mapping information 1101 in which an ICCID prefix is mapped with an MNO name. Further, the controller receiving an ICCID value is required to convert the received ICCID value into an MNO name by referring to the mapping information 1101. In another embodiment, such mapping information may be stored in any external server, and the controller may send the ICCID value to the external server and receive the MNO name from the external server. In still another embodiment, the SM-SR may convert the ICCID value into the MNO name and transfer the MNO name to the controller. Additionally, at step S1100, UI may offer MNO name mapping information to the user and inform the user that the MNO A profile is ready to be downloaded. Then, a profile download procedure may be performed depending on a user's choice.

Figure 12:
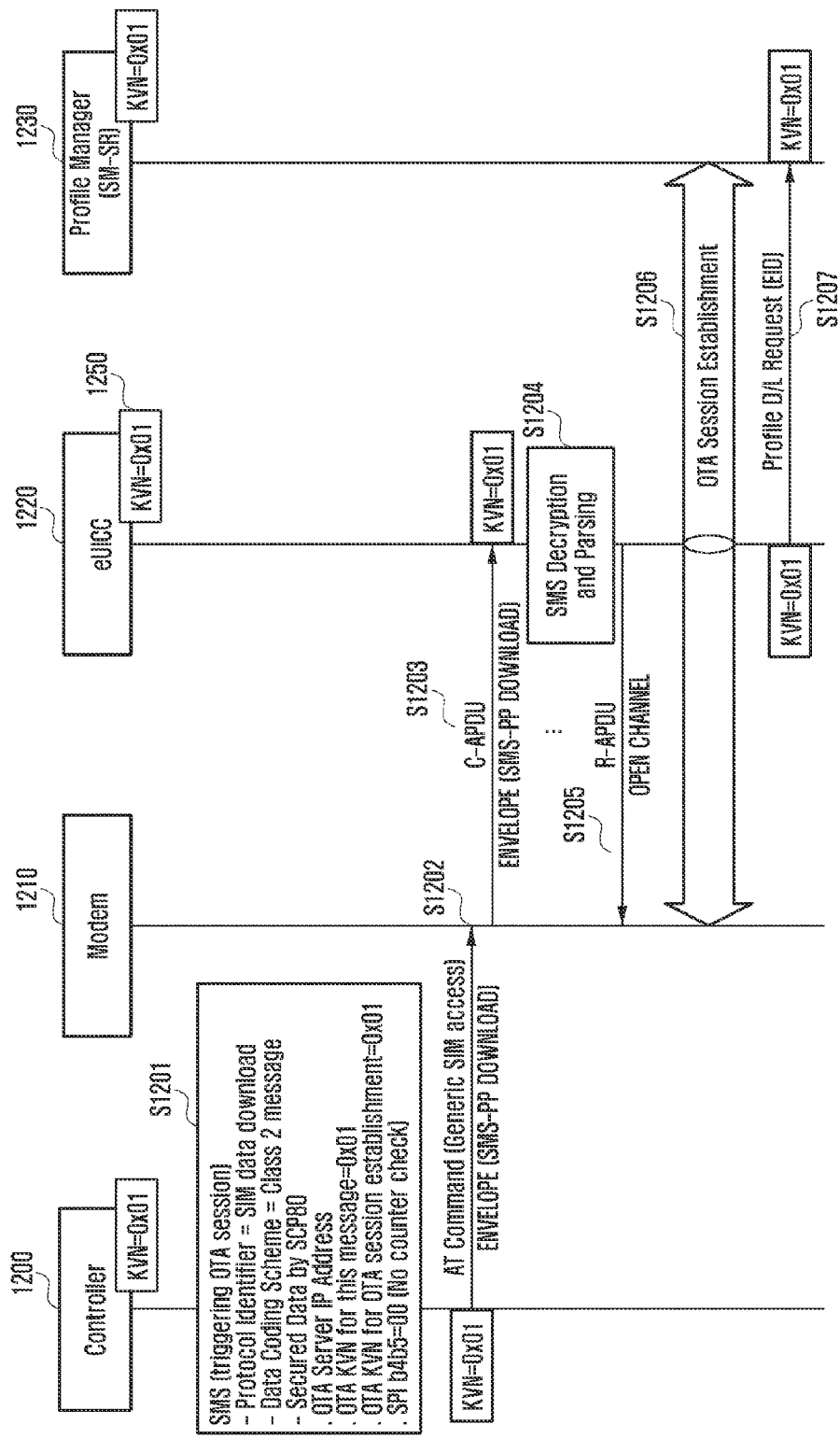
FIG. 12 is a diagram illustrating a flow of performing SMS emulation at a controller in accordance with the present invention.

FIG. 12 is a diagram illustrating a flow of performing SMS emulation at a controller in accordance with the present invention.

As previously discussed in FIG. 4, the mobile network may send SMS, and the modem of the terminal receiving the SMS may convert it into ENVELOPE (SMS-PP DOWNLOAD) C-APDU and transfer it to the eUICC. Alternatively, at step S1201, the controller 1200 of the terminal may create SMS, in place of SM-SR and SMSC, and convert it in the form of ENVELOPE (SMS-PP DOWNLOAD) C-APDU. Then, the controller 1200 may transfer the ENVELOPE (SMS-PP DOWNLOAD) C-APDU to the modem 1210 (i.e. the communication unit) through the AT command at step S1202, and the modem 1210 may transfer it to the eUICC 1220.

Referring to FIG. 12, the controller 1200 of the terminal may use in common, as a key value for SMS certification and encryption, a key value used for OTA by SM-SR. In this case, it is desirable that SPI b4b5 is set to 00 so as not to cause an error due to a failure in counter verification. Additionally, in this embodiment, the OTA key value is stored in 0x01 among the total fifteen Key Version Numbers, 0x01~0x0F, which can store the OTA key value in the eUICC.

At step S1203, the modem 1210 receiving SMS may transfer the SMS to the eUICC 1220 in the form of C-APDU packet defined in the ISO-7816 standards. The C-APDU for this purpose is referred to as ENVELOPE (SMS-PP DOWNLOAD) and defined for triggering the OTA session by using SMS in the 3GPP standards.

At step S1204, the eUICC 1220 receiving the ENVELOPE (SMS-PP DOWNLOAD) C-APDU extracts the SMS by parsing the received C-APDU and decrypts the data field of the SMS with its own OTA key.

The decrypted data may contain the IP address of the SM-SR server and a KVN value of the OTA key value for establishing the OTA session with the SM-SR server. For OTS session establishment with the SM-SR 1230 using this, the eUICC 1220 may transmit OPEN CHANNEL R-APDU to the modem 1210 at step S1205.

Therefore, the OTA session between the eUICC and the SM-SR server is established at step S1206, and the eUICC downloads a profile through this session at step S1207. The OTA session may use KVN=0x01 (1250) which is the same as used for typically encrypting the SMS.

Figure 13:
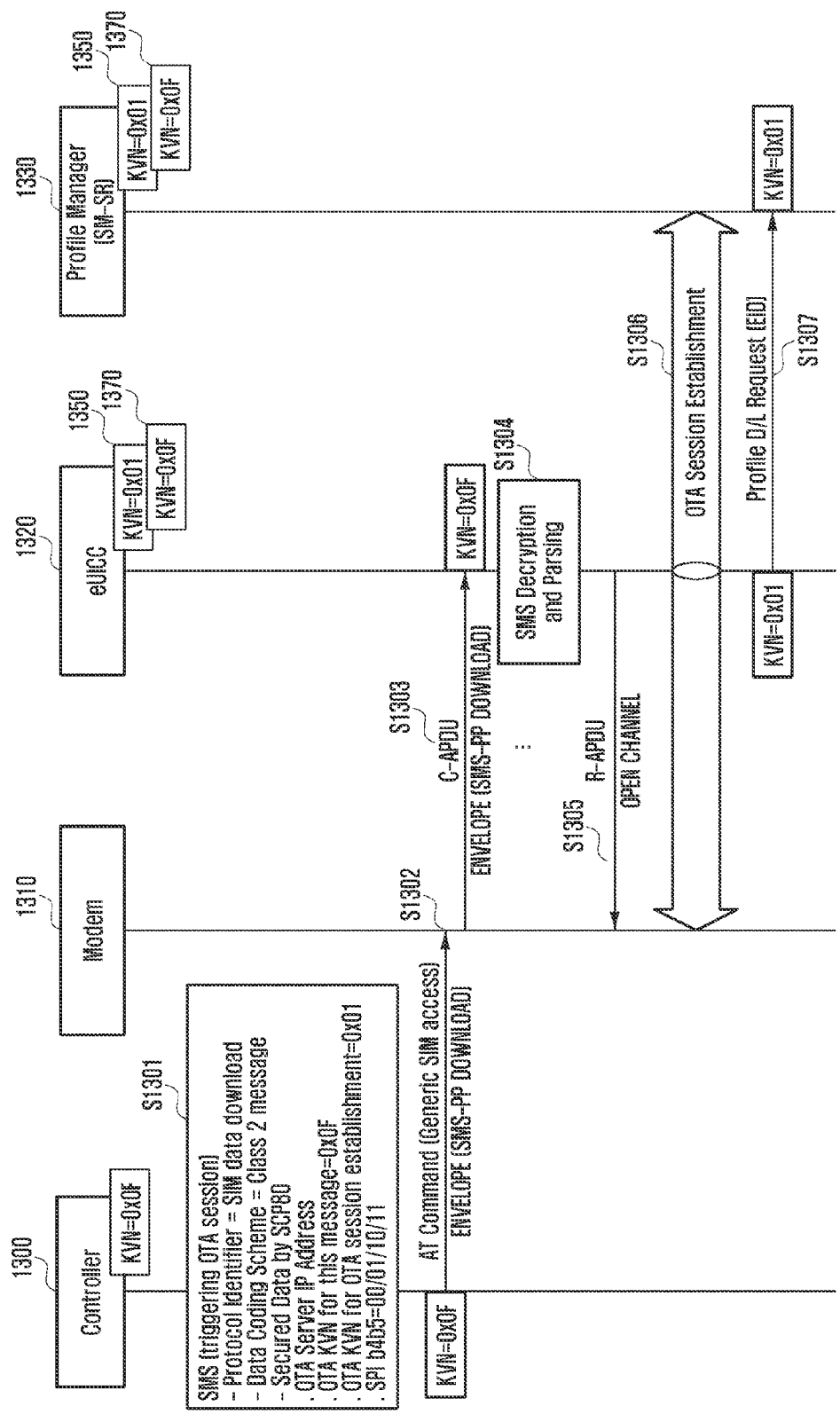
FIG. 13 is a diagram illustrating SMS emulation using KVN other than OTA key used in SM-SR between a controller and eUICC.

FIG. 13 is a diagram illustrating SMS emulation using KVN other than OTA key used in SM-SR between a controller and eUICC.

Although FIG. 13 uses 0x0F as an example value of KVN used between the eUICC 1320 and the controller 1300, this is exemplary only and not to be considered as a limitation. While in an embodiment shown in FIG. 12 the controller of the terminal uses in common an OTA key KVN=0x01 value used between the SM-SR server and the eUICC, in an embodiment shown in FIG. 13 a new key value corresponding to a new KVN=0x0F (1370) may be stored and shared between the controller 1300 and the eUICC 1310. This key value may be used for the controller to encrypt SMS data and for the eUICC to certificate and decrypt SMS. At this time, like FIG. 12, the controller may set the b4b5 bit of SPI in the SMS encryption header to 00 so that the eUICC 1320 may not perform a counter check, or set the b4b5 to 01/10/11 which is an option of allowing the controller 1300 and the eUICC 1320 to manage and check each other.

Meanwhile, FIG. 13 shows that the SM-SR 1330 has also a key value corresponding to KVN=0x0F (1350). According to this embodiment, although the SM-SR does not need to have a key value of KVN=0x0F (1350), the SM-SR 1330 is supposed to store therein key values corresponding to all KVNs since it is a management server for the eUICC.

Excepting the above-discussed difference, steps S1301 to S1307 are the same as steps S1201 to S1207 in FIG. 12. Therefore, detailed descriptions thereof will be omitted.

Figure 14:
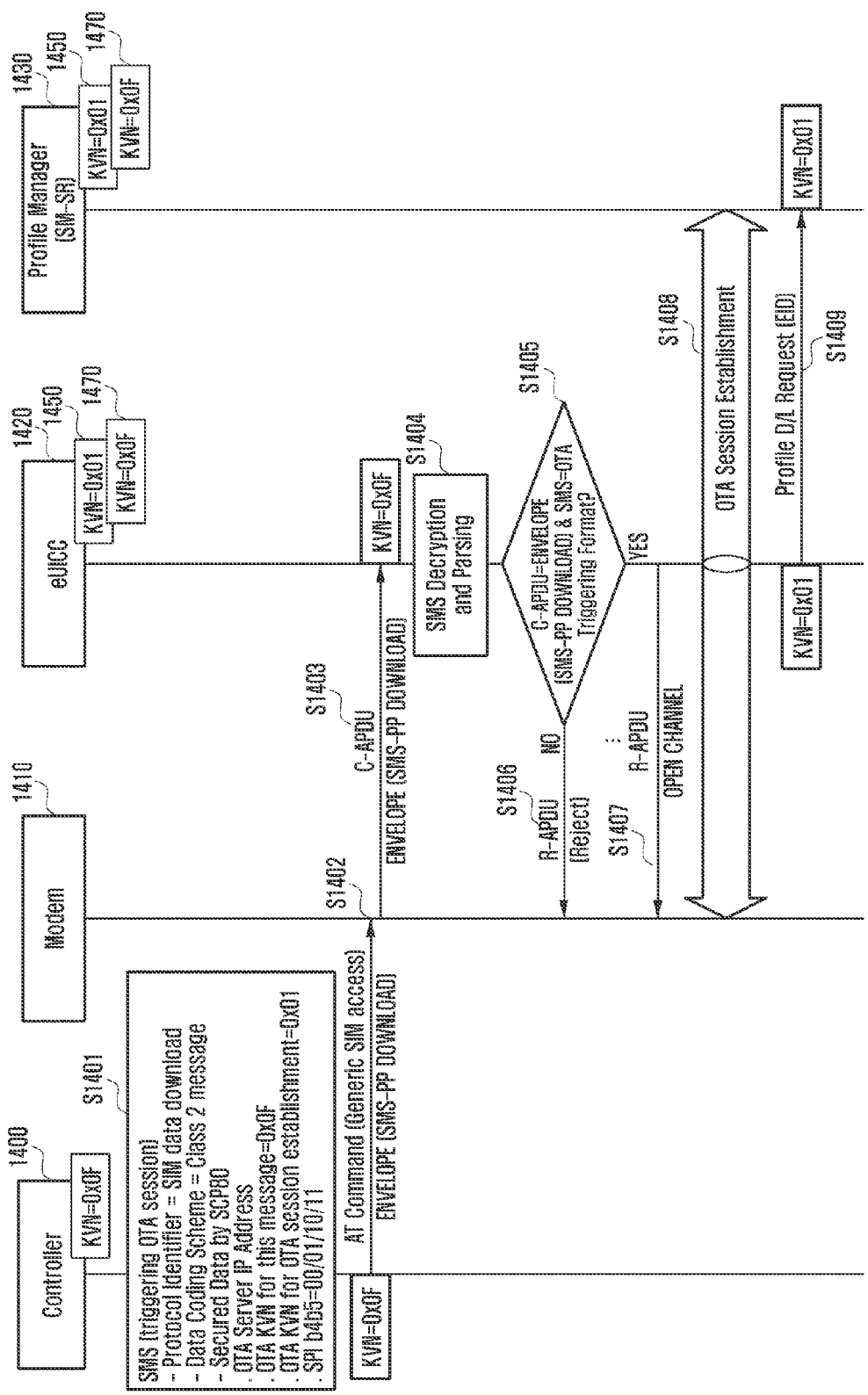
FIG. 14 is a diagram illustrating an operation of eUICC for rejecting C-APDU (Command APDU) for a security reason when the C-APDU transmitted to the eUICC of a terminal is not C-APDU for OTA session triggering.

FIG. 14 is a diagram illustrating an operation of eUICC for rejecting C-APDU (Command APDU) for a security reason when the C-APDU transmitted to the eUICC of a terminal is not C-APDU for OTA session triggering.

When C-APDU transmitted to the eUICC 1420 is protected with a key value of KVN=0x0F (1450), namely when the eUICC can be aware of C-APDU for OTA session triggering since C-APDU is protected with a KVN=0x0F key value shared with the terminal controller rather than a KVN=0x01 key value shared with the profile manager, a security mechanism in which the eUICC rejects a received C-APDU which is not a C-APDU for OTA session triggering may be added. Namely, steps S1401 to S1404 may be the same as steps S1301 to S1304 in FIG. 13, and at step S1405 the eUICC 1420 may determine whether the received C-APDU is an OTA triggering format. In case of being not a proper C-APDU, the eUICC 1420 may reject the creation of OTA session at step S1406. In case of C-APDU for OTA triggering, steps S1407 to S1409 will be performed. These steps are the same as steps S1305 to S1307 in FIG. 13, so that detailed descriptions thereof will be omitted.

If a KVN=0x0F key value used in the controller is exposed due to hacking, a scheme proposed in a FIG. 14 embodiment may prevent a task, such as read/write of file values in the eUICC, from being performed using the exposed key value. Therefore, this embodiment may further enhance security in comparison with earlier embodiments.

Figure 15:
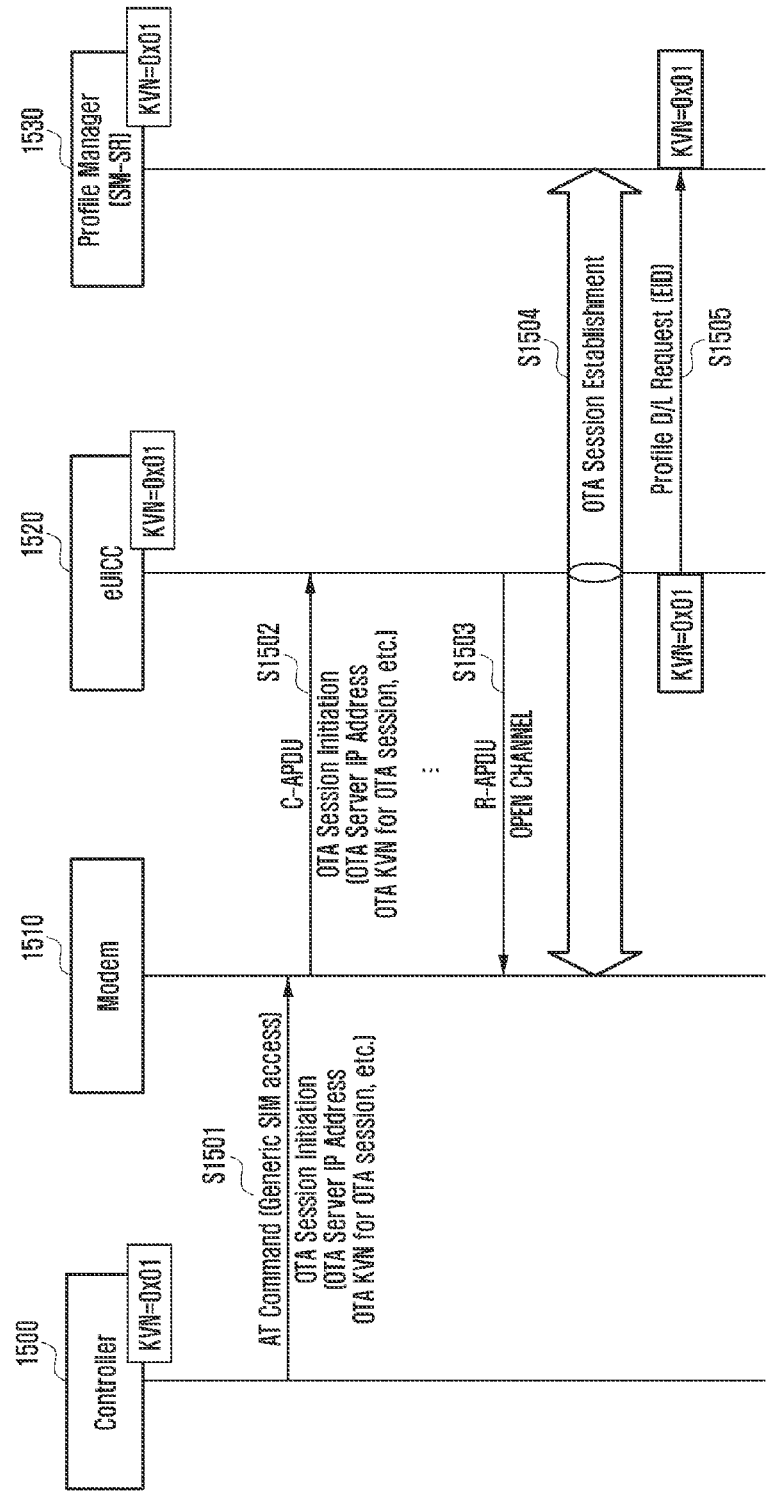
FIG. 15 is a diagram illustrating OTA session triggering using newly defined C-APDU between a controller and eUICC.

FIG. 15 is a diagram illustrating OTA session triggering using newly defined C-APDU between a controller and eUICC.

While in the embodiments of FIGS. 12 to 14 the controller fakes SMS emulation as if the modem receives SMS from the network, in this embodiment of FIG. 15 the eUICC 1520 newly defines C-APDU for OTA session initiation. Further, at step S1501, the controller 1500 creates such a newly defined C-APDU and transmits it to the eUICC to start the OTA session. Parameters of the C-APDU may include an IP address of the OTA server, a KVN for determining which value will be used for an encryption key used in a communication with the OTA server, and the like.

Namely, the C-APDU for OTA session initiation is newly defined in FIG. 15, and steps S1503 to S1505 after triggering are the same as steps S1305 to S1307 in FIG. 13. Therefore, detailed descriptions thereof will be omitted.

Figure 16:
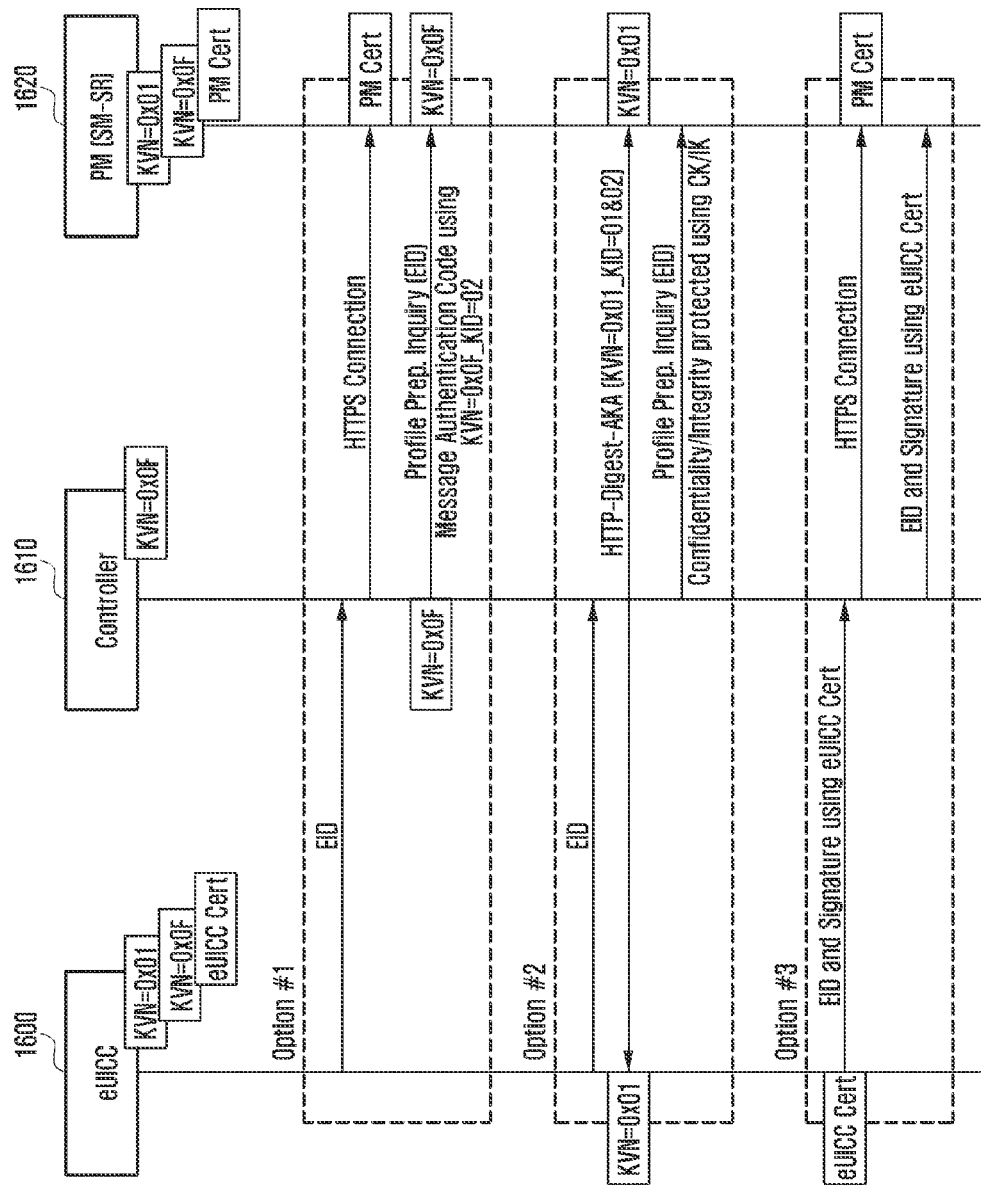
FIG. 16 is a diagram illustrating a method for certification and encryption in a communication between a controller and SM-SR.

FIG. 16 is a diagram illustrating a method for certification and encryption in a communication between a controller and SM-SR.

Referring to FIG. 16, there are three options (i.e. Option #1, #2 and #3) of certification and encryption between the controller 1610 and the profile management server 1620.

Option #1 is to create a message authentication code for a message created by the controller using a key value corresponding to KVN=0x0F stored in the controller, and to verify this at the SM-SR server. If authentication of the SM-SR server and encryption of a message are required, a message may be transmitted and received between the controller and the SM-SR server after the HTTPS session is created using a certification (PM Cert) of the SM-SR server.

Option #2 is to perform mutual authentication between the terminal and the server by using a KVN=0x01 key value shared between the eUICC and the SM-SR server, and to perform security for a message by using CK, IK key values created at this time.

In Option #3, the eUICC creates a signature value by using an eUICC certification stored in the eUICC, and the controller inserts the signature value into a message to be transmitted to the SM-SR server. By verifying the signature value, the SM-SR server may ascertain that the message is transmitted from a proper terminal having therein the eUICC. If authentication of the SM-SR server and encryption of a message are required, a message may be transmitted and received between the controller and the SM-SR server after the HTTPS session is created using a certification (PM Cert) of the SM-SR server.

Figure 17A:
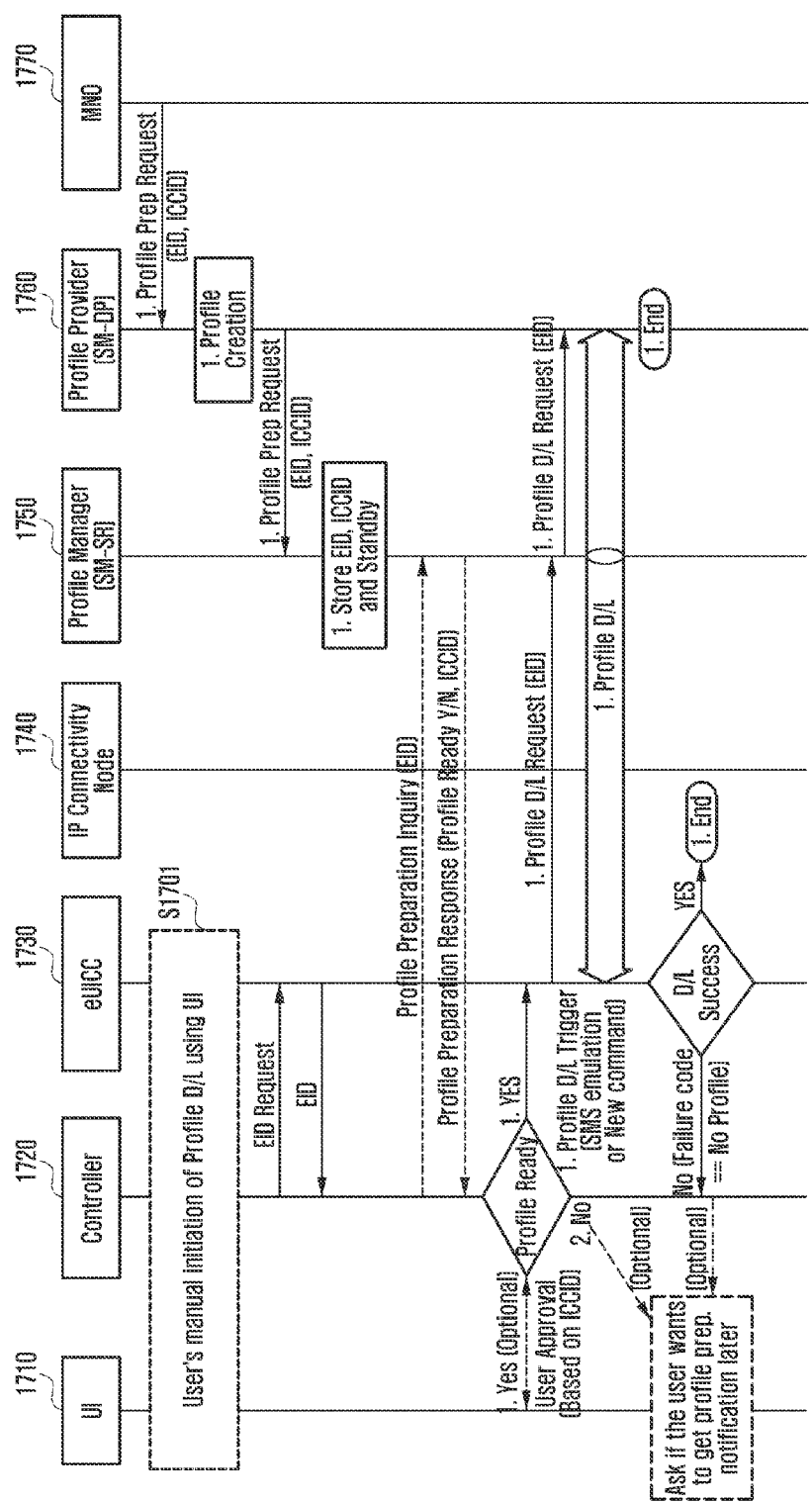
FIGS. 17A and 17B are diagrams illustrating an overall procedure of performing a profile download by utilizing UI.
Figure 17B:
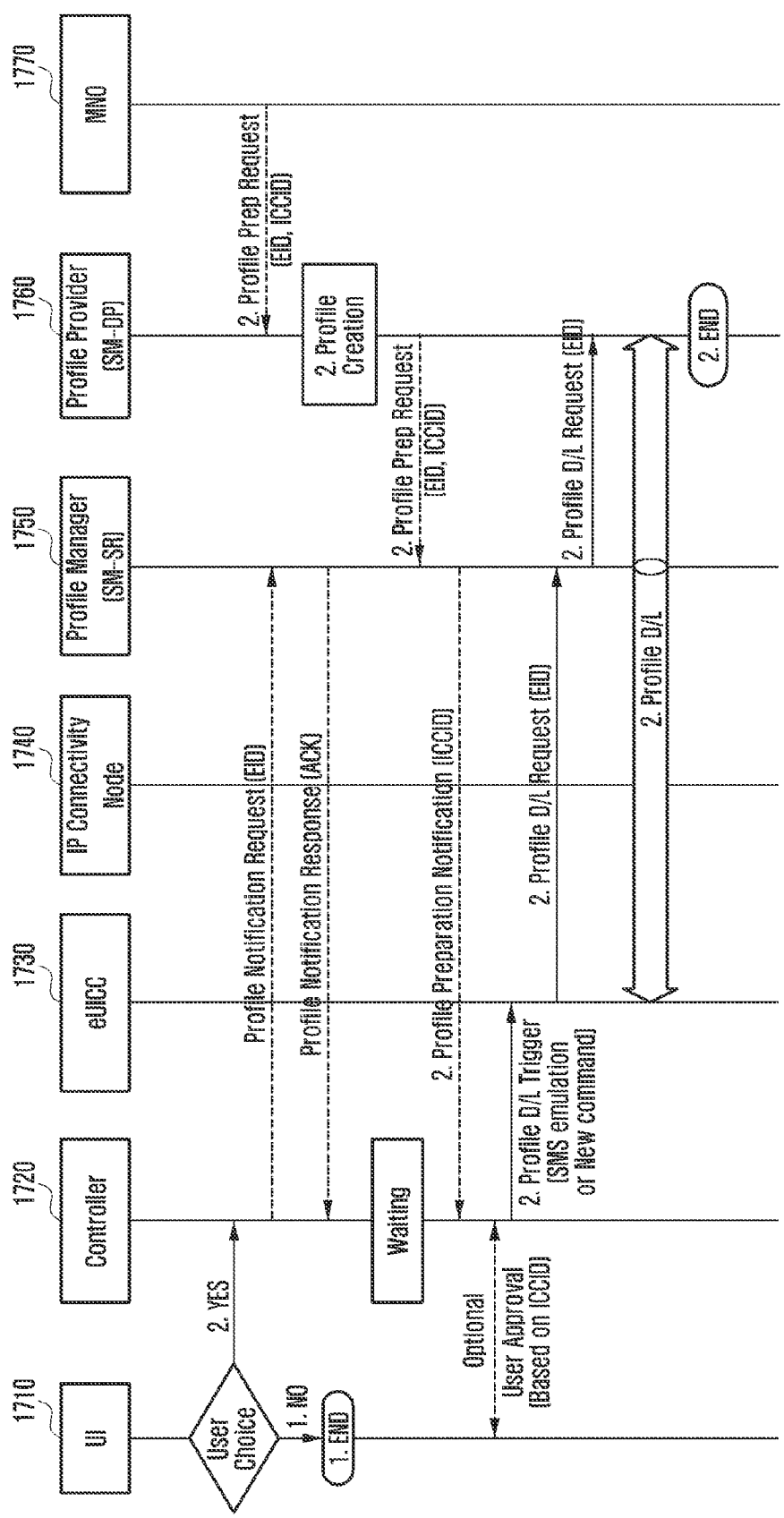

FIGS. 17A and 17B are diagrams illustrating an overall procedure of performing a profile download by utilizing UI.

Referring to FIG. 17A, the UI may be contained in the terminal having the controller or alternatively contained in any other terminal connected with the terminal through WiFi, Bluetooth, USB cable, or the like. At step S1701, the initiation of a profile download is performed in response to a user's input on UI without depending on an algorithm of the controller. Other steps of FIGS. 17A and 17B are the same as discussed in earlier embodiments.

Namely, excepting step S1701, the other steps are the same as steps from S902 in FIGS. 9A and 9B. Therefore, detailed descriptions thereof will be omitted.

Figure 18:
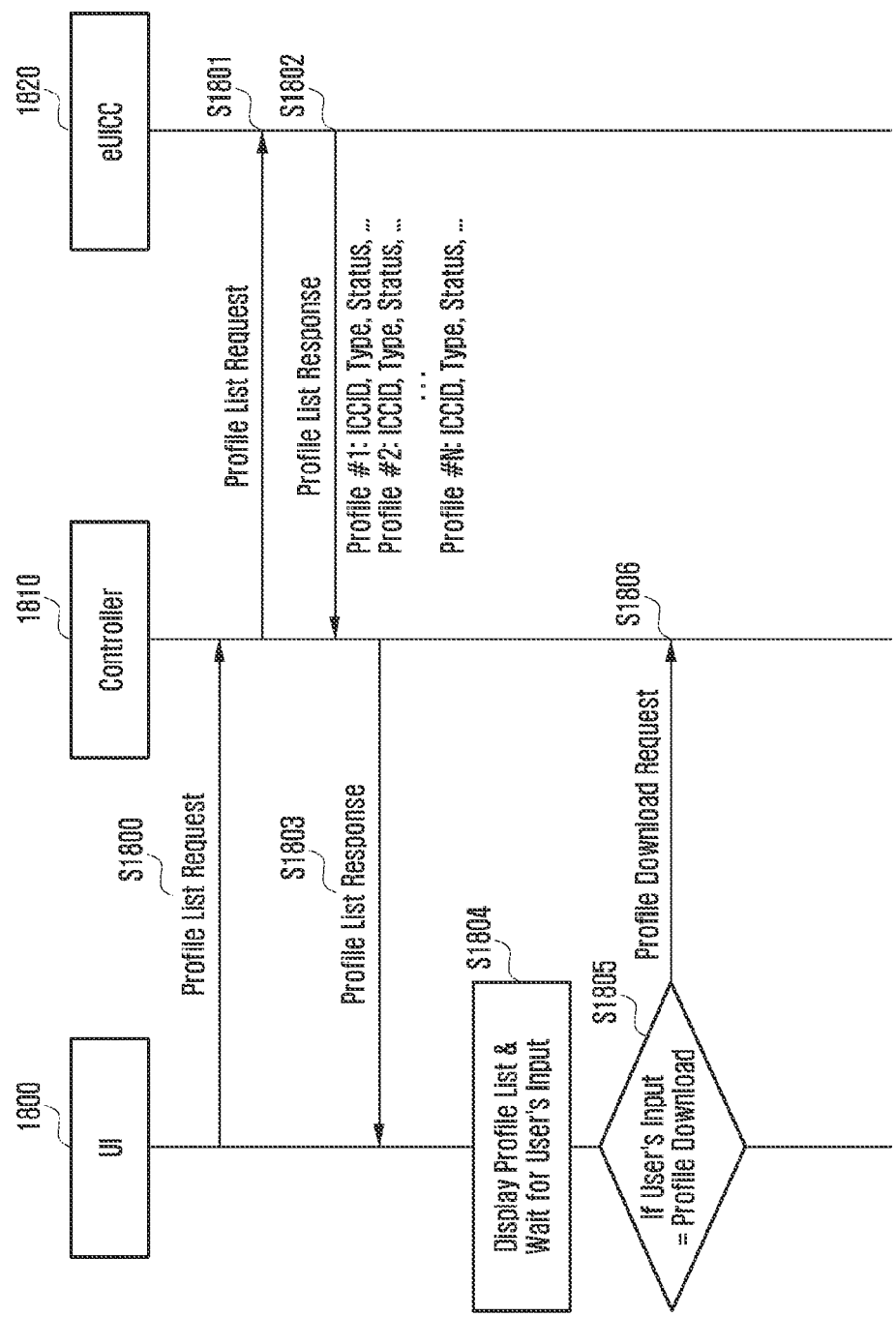
FIG. 18 is a diagram illustrating a procedure of requesting a profile list to eUICC by using UI.

FIG. 18 is a diagram illustrating a procedure of requesting a profile list to eUICC by using UI.

Referring to FIG. 18, at step S1800, the UI 1800 may transmit a Profile List Request to the controller. Also, at step S1801, the controller 1810 may transfer the received Profile List Request to the eUICC 1820.

At step S1802, the eUICC 1820 may transfer a previously stored profile list to the controller 1810 in response to the received request. At step S1803, the controller 1810 may transfer the received profile list to the UI. At step S1804, the UI 1800 may display the received profile list to the user and wait for a user's input. If a user's input is a profile download request at step S1805, the UI 1800 may transfer the profile download request message to the controller 1810 at step S1806.

Figure 19:
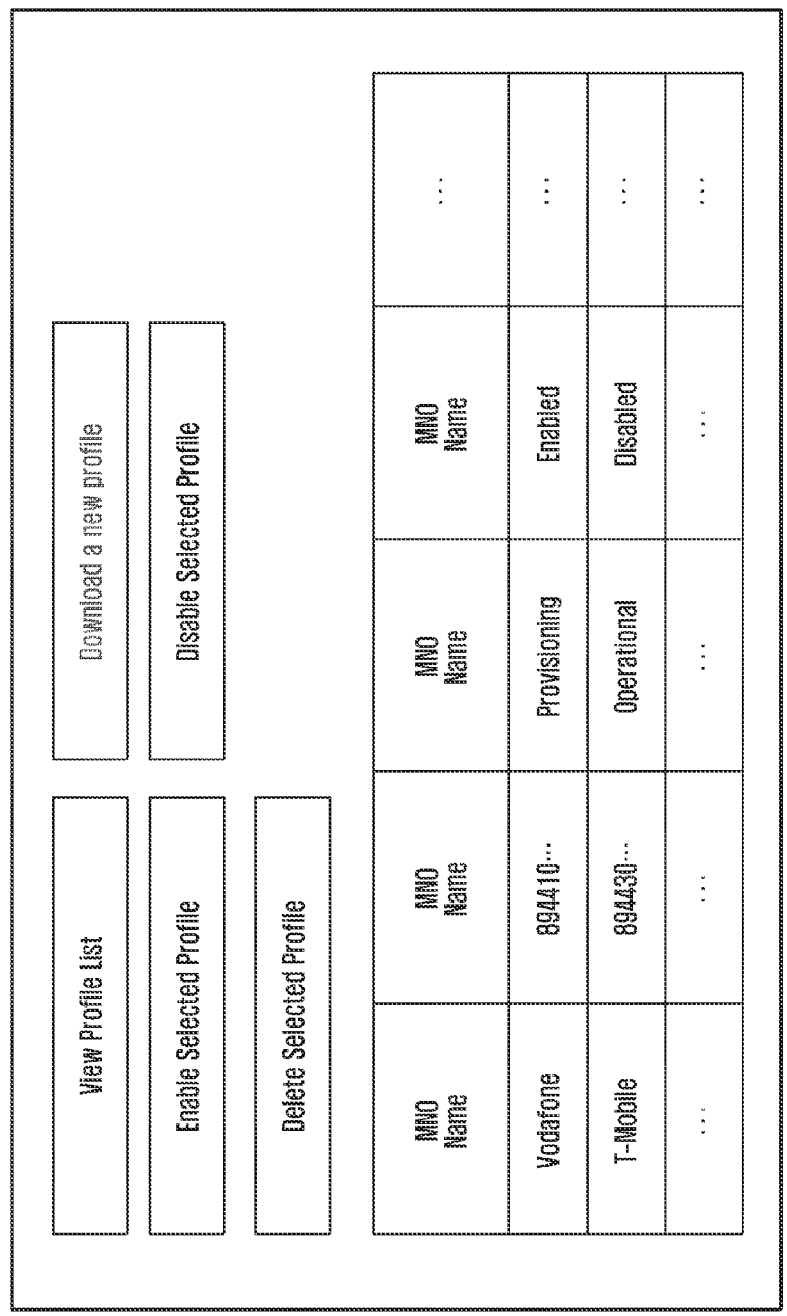
FIG. 19 is a diagram illustrating a screen that displays to a user a profile list received from eUICC and offers a menu for allowing the user to start the download of a new profile.

FIG. 19 is a diagram illustrating a screen that displays to a user a profile list received from eUICC and offers a menu for allowing the user to start the download of a new profile.

Referring to FIG. 19, the UI finds an MNO name from an ICCID value and outputs it on the screen so that the user can decide whether a profile download of a new MNO is needed.

A method for finding the MNO name from the ICCID value may use the above-discussed mapping information. This mapping information may be stored in the storage unit of the terminal or any external server located at the outside of the terminal. To find the MNO name, the UI or the controller may retrieve the MNO name from the storage unit or the like.

Figure 20:
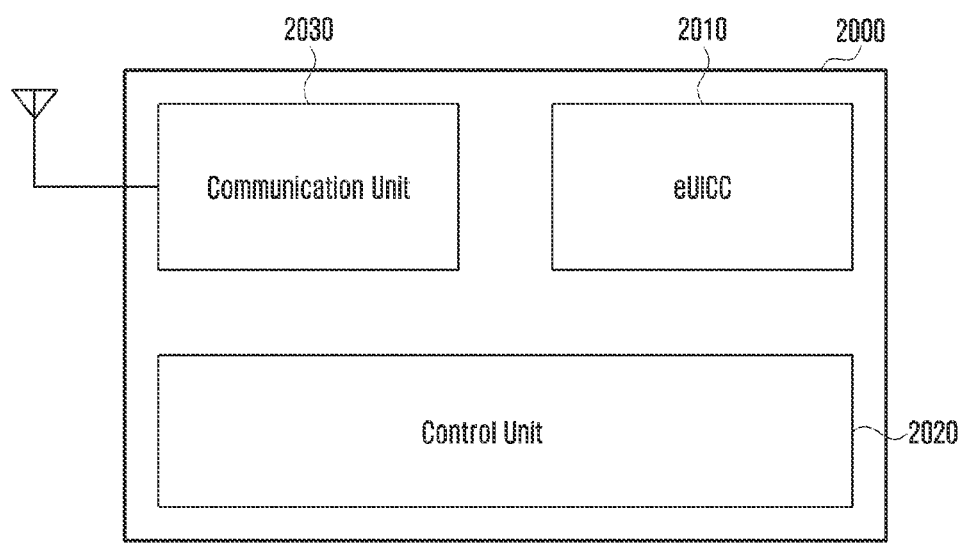
FIG. 20 is a block diagram illustrating a simplified structure of a terminal for performing a profile installation in accordance with an embodiment of the present invention.

FIG. 20 is a block diagram illustrating a simplified structure of a terminal (ex. 600 in FIG. 6) for performing a profile installation in accordance with an embodiment of the present invention.

Referring to FIG. 20, the terminal 2000 of this invention may include the eUICC 2010, the control unit 2020, and the communication unit 2030.

The eUICC 2010 may install a profile through a profile download using OTA technology. The eUICC 2010 comprises at least one of a non-removable (ex. embedded) security module or removable security module. The eUICC 2010 comprises chip-type security module.

The control unit 2020 may create information for triggering reception of the profile. The created information comprises at least one of a virtual Short Message Service (SMS) or a new command.

Additionally, the control unit 2020 may transmit a profile download triggering signal including the information to the eUICC 2010.

Additionally, the control unit 2020 may determine autonomously to download a new profile, and/or may receive a command of downloading the new profile from at least one of a user interface of the terminal 2000 or an external device located at the outside of the terminal 2000 (referring to 605 and 607 in FIG. 6), and then may create the information.

Additionally, the control unit 2020 may identify an identifier of the eUICC 2010.

Before downloading the profile, the control unit 2020 may identify whether a profile management server (ex. 612 in FIG. 6) completes a profile download preparation. For example, the control unit 2020 may transmit, using the communication unit 2030, a profile download preparation inquiry including the identifier of the eUICC 2010 to the profile management server. The control unit 2020 and may receive, using the communication unit, a response of the profile download preparation inquiry including an identifier of the profile from the profile management server.

The eUICC 2010 may receive the profile download triggering signal including the information from the control unit 2010.

Additionally, the eUICC 2010 may access a profile management server and receive the profile based on the information using the communication unit 2030, and install the received profile. For example, the eUICC 2010 may transmit, using the communication unit 2030, a profile download request to the profile management server based on the received information. The eUICC 2010 may download, using the communication unit 2030, the profile from the profile management server and install the received profile.

The control unit 2020 and the eUICC 2010 may store and use an authentication key. For example, the control unit 2020 may uses in common the authentication key used between the profile management server and the eUICC 2010, or the control unit 2020 may share the authentication key with the eUICC 2010 regardless of the profile management server.

The control unit 2020 may encrypt the information using the stored authentication key. The eUICC 2010 may certificate and decrypt the information received from the control unit 2020 using the stored authentication key. Additionally, the eUICC 2010 may determine whether the authentication key of the terminal used for creating the information is identical to the authentication key previously stored in the eUICC 2010, and also check a counter contained in the information.

In this case, if the authentication key of the terminal 2000 used for creating the information is identical to the authentication key previously stored in the eUICC 2010, the eUICC 2010 may certificate the information regardless of a counter value.

The eUICC 2010 may access, using the communication unit 2030, the profile management server based on an IP-based communication network. For example, the eUICC 2010 may transmit, using the communication unit 2030, a profile download request to the profile management server based on the IP-based communication network.

The eUICC 2010 may access the profile management server, based on the IP address contained in the information created at the control unit 2020 and/or stored in the eUICC 2010, and then receive the profile from the profile management server.

Figure 21:
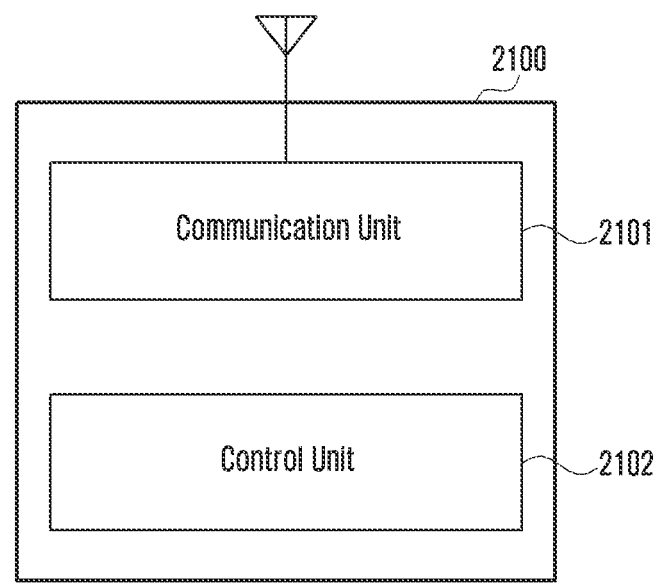
FIG. 21 is a block diagram illustrating a simplified structure of a profile management server for providing a profile in accordance with an embodiment of the present invention.

FIG. 21 is a block diagram illustrating a simplified structure of a profile management server (ex. 612 in FIG. 6) for providing a profile in accordance with an embodiment of the present invention.

Referring to FIG. 21, the profile management server 2100 may include the communication unit 2101 and the control unit 2102.

The communication unit 2101 may connect the profile management server 2100 with any type of external devices. In this invention, the profile management server 2100 may be connected with the profile providing server (ex. 611 in FIG. 6) and the terminal (ex. 600 in FIG. 6).

The control unit 2102 may receive a profile preparation request message from a profile providing server that creates the profile.

The control unit 2102 may determine whether to receive a profile download request from an eUICC of the terminal using the communication unit 2101. if the profile download request is received from the eUICC of the terminal, the control unit 2102 may transmit, using communication unit 2101, the profile to the eUICC of the terminal in response to the request.

The control unit 2102 may control various parts in the profile management server as well as the communication unit 2101.

The control unit 2102 may receive, using the communication unit 2101, a created profile from the profile providing server, store it, and be on standby.

Until the profile download request arrives at the communication unit 2101 from the eUICC of the terminal, the control unit 2102 may receive a profile download preparation inquiry including an identifier of Euicc (ex. EID) from the terminal using the communication unit 2101. The control unit 2102 may transmit a response of the profile download preparation inquiry including an identifier of the profile (ex. ICCID) to the terminal using the communication unit 2101.

Additionally, the control unit 2102 may certificate the terminal by comparing an authentication key contained in the eUICC with an authentication key contained in the server, and also establish a communication channel for Over The Air (OTA) session with the certificated terminal.

According to various embodiments of this invention, the terminal having therein the eUICC may remotely download the Operation Profile without a direct access to the mobile network if IP packet is allowed to be transmitted or received in the manner of Wi-Fi, Bluetooth, Wired (or USB) cable, or the like.

Additionally, according to various embodiments of this invention, the Provisioning Profile may not necessarily be mounted at the manufacture of the terminal having the eUICC. This may reduce the prices of eUICC chips and terminals.

Further, according to various embodiments of this invention, a manufacturing process and inventory management of eUICC chip and terminal may also be simplified.

While this disclosure has been particularly shown and described with reference to an exemplary embodiment thereof, it will be understood by those skilled in the art that various changes in form and details may be made therein without departing from the scope of this disclosure as defined by the appended claims.

What is claimed is:

1. A terminal comprising:
a communication unit configured to transmit and receive a signal;
a controller configured to:
generate a virtual short message service (SMS) message, and
transmit the virtual SMS message to the communication unit; and
a universal integrated circuit card configured to:
in response to the controller transmitting the virtual SMS message to the communication unit, receive a profile download triggering signal from the communication unit,
when the profile download triggering signal is received, control the communication unit to access a profile management server and receive a profile from the profile management server based on an internet protocol (IP) address of the profile management server, and
install the received profile.

2. The terminal of claim 1, wherein the IP address of the profile management server is included in the virtual SMS message.

3. The terminal of claim 1, wherein the controller is further configured to generate the virtual SMS message based on at least one of an autonomous determination of the controller for a new profile download, or a reception of a command for the new profile download from at least one of a user interface of the terminal or an external device located at an outside of the terminal.

4. The terminal of claim 1, wherein the controller is further configured to:
identify an identifier of the universal integrated circuit card,
transmit, using the communication unit, a profile download preparation inquiry including the identifier of the universal integrated circuit card to the profile management server, and
receive, using the communication unit, a response of the profile download preparation inquiry including an identifier of the profile from the profile management server.

5. The terminal of claim 1,
wherein the controller and the universal integrated circuit card store an authentication key,
wherein the controller is further configured to encrypt the virtual SMS message using the authentication key, and
wherein the universal integrated circuit card is further configured to certificate and decrypt the virtual SMS message using the authentication key.

6. The terminal of claim 1, wherein the IP address of the profile management server is stored in the universal integrated circuit card.

7. The terminal of claim 1, wherein the universal integrated circuit card is physically embedded in the terminal.

8. A server comprising:
a communication unit configured to transmit and receive a signal; and
a controller configured to:
receive, using the communication unit, a profile download request including an identifier of a universal integrated circuit card, from the universal integrated circuit card of a terminal, wherein the profile download request is transmitted when a profile download triggering signal is transmitted from a communication unit of the terminal to the universal integrated circuit card of the terminal after a virtual short message service (SMS) message generated by a controller of the terminal is transmitted to the communication unit of the terminal, and
transmit, using the communication unit, a profile to the universal integrated circuit card of the terminal based on the identifier of the universal integrated circuit card.

9. The server of claim 8, wherein the controller is further configured to:
receive, before receiving the profile download request from the universal integrated circuit card of the terminal, a profile download preparation inquiry including the identifier of the universal integrated circuit card from the terminal using the communication unit, and
transmit a response of the profile download preparation inquiry including an identifier of the profile to the terminal using the communication unit.

10. The server of claim 8, wherein the controller is further configured to receive, using the communication unit, the profile download request from the terminal based on an IP-based communication network.

11. The server of claim 8, wherein the universal integrated circuit card is physically embedded in the terminal.

12. A method for installing a profile at a terminal including a communication unit, a controller, and a universal integrated circuit card, the method comprising:
generating, by the controller, a virtual short message service (SMS) message;

transmitting the virtual SMS message to the communication unit;

in response to the controller transmitting the virtual SMS message to the communication unit, receiving, by the universal integrated circuit card, a profile download triggering signal from the communication unit;

when the profile download triggering signal is received, accessing, by the universal integrated circuit card, a profile management server and receiving the profile from the profile management server based on an internet protocol (IP) address of the profile management server using the communication unit; and installing, by the universal integrated circuit card, the received profile.

13. The method of claim 12, wherein the IP address of the profile management server is included in the virtual SMS message.

14. The method of claim 12, wherein the generating, by the controller, of the information comprises:

generating the virtual SMS message based on at least one of an autonomous determination of the controller for a new profile download, or a reception of a command for the new profile download from at least one of a user interface of the terminal or an external device located at an outside of the terminal.

15. The method of claim 12, further comprising:

identifying, by the controller, an identifier of the universal integrated circuit card;

transmitting, by the controller, a profile download preparation inquiry including the identifier of the universal integrated circuit card to the profile management server using the communication unit; and receiving, by the controller, a response of the profile download preparation inquiry including an identifier of the profile from the profile management server using the communication unit.

16. The method of claim 12, wherein an authentication key is stored in the controller and the universal integrated circuit card, and wherein the method further comprises:

encrypting, by the controller, the virtual SMS message using the authentication key, and certificating and decrypting, by the universal integrated circuit card, the virtual SMS message using the authentication key.

17. The method of claim 12, wherein the IP address of the profile management server is stored in the universal integrated circuit card.

18. The method of claim 12, wherein the universal integrated circuit card is physically embedded in the terminal.

19. A method for providing a profile at a server to a terminal including a universal integrated circuit card, the method comprising:

receiving, using a communication unit, a profile download request including an identifier of the universal integrated circuit card, from the universal integrated circuit card of the terminal, wherein the profile download request is transmitted when a profile download triggering signal is transmitted from a communication unit of the terminal to the universal integrated circuit card of the terminal after a virtual short message service (SMS) message generated by a controller of the terminal is transmitted to the communication unit of the terminal; and transmitting, using the communication unit, the profile to the universal integrated circuit card of the terminal based on the identifier of the universal integrated circuit card.

20. The method of claim 19, further comprising:

receiving, before receiving the profile download request from the universal integrated circuit card of the terminal, a profile download preparation inquiry including the identifier of the universal integrated circuit card from the terminal using the communication unit; and transmitting a response of the profile download preparation inquiry including an identifier of the profile to the terminal using the communication unit.

21. The method of claim 19, wherein the receiving of the profile download request from the universal integrated circuit card of the terminal is performed based on an IP-based communication network.

22. The method of claim 19, wherein the universal integrated circuit card is physically embedded in the terminal.

* * * * *